United States Patent [19]
Okada et al.

[11] Patent Number: 5,956,029
[45] Date of Patent: Sep. 21, 1999

[54] USER INTERFACE CONVERSION METHOD AND APPARATUS

[75] Inventors: Yoshihiko Okada; Katsuhiro Yamanaka, both of Tokyo, Japan

[73] Assignee: NEC Corporation, Tokyo, Japan

[21] Appl. No.: 08/925,950

[22] Filed: Sep. 8, 1997

[30] Foreign Application Priority Data

Sep. 9, 1996 [JP] Japan ................................. 8-237588

[51] Int. Cl.⁶ ............................. G06F 3/14; G06F 13/00
[52] U.S. Cl. ........................................ 345/334; 345/333
[58] Field of Search .................................. 345/326, 333, 345/334; 434/112, 113, 114

[56] References Cited

U.S. PATENT DOCUMENTS

| | | | |
|---|---|---|---|
| 5,179,700 | 1/1993 | Aihara et al. | 345/326 |
| 5,287,102 | 2/1994 | McKiel, Jr. | 340/825.19 |
| 5,347,627 | 9/1994 | Hoffmann et al. | 345/334 |
| 5,522,024 | 5/1996 | Higara et al. | 345/333 |
| 5,603,034 | 2/1997 | Swanson | 345/333 X |

FOREIGN PATENT DOCUMENTS

| | | |
|---|---|---|
| 4-273518 | 9/1992 | Japan . |
| 4-284531 | 10/1992 | Japan . |
| 6-168058 | 6/1994 | Japan . |
| 6-232941 | 8/1994 | Japan . |
| 6-282396 | 10/1994 | Japan . |
| 6-289982 | 10/1994 | Japan . |
| 8-69385 | 3/1996 | Japan . |
| 8-76968 | 3/1996 | Japan . |
| 8-212047 | 8/1996 | Japan . |
| 8-339350 | 12/1996 | Japan . |

*Primary Examiner*—Raymond J. Bayerl
*Assistant Examiner*—Chadwick A. Jackson
*Attorney, Agent, or Firm*—Foley & Lardner

[57] ABSTRACT

In a user interface conversion method of converting a picture interface provided by an application program running on an operating system having a graphical user interface to generate and provide a new picture interface, picture information of the application program is acquired in response to, as a trigger, a change in the picture provided by the application program. A target point in the acquired picture information is determined. Converted picture information is generated from the determined target point by referring to conversion template information. A converted picture is displayed in accordance with the generated converted picture information. A user interface conversion apparatus is also disclosed.

10 Claims, 23 Drawing Sheets

DISPLAY PICTURE

```
BACKGROUND
  ├─WINDOW 1 ... POSITION, SIZE, CURRENT, ..., etc.
  │   ├─TITLE BAR ... TITLE 1
  │   │    ├─CONTROL BUTTON
  │   │    ├─MINIMIZE BUTTON
  │   │    └─MAXIMIZE BUTTON
  │   ├─MENU BAR ... MENU ITEM
  │   ├─SCROLL BAR ... POSITION
  │   ├─CLIENT ... CONTENTS
  │   │
  │   └─ , ..., etc.
  │
  ├─WINDOW 2 ... POSITION, SIZE, ..., etc.
  │   │
  │   └─ , ..., etc.
  │
  └─WINDOW 3 ... POSITION, SIZE, ..., etc.
      │
      └─ , ..., etc.
```

PICTURE INFORMATION

TARGET POINT PICTURE INFORMATION

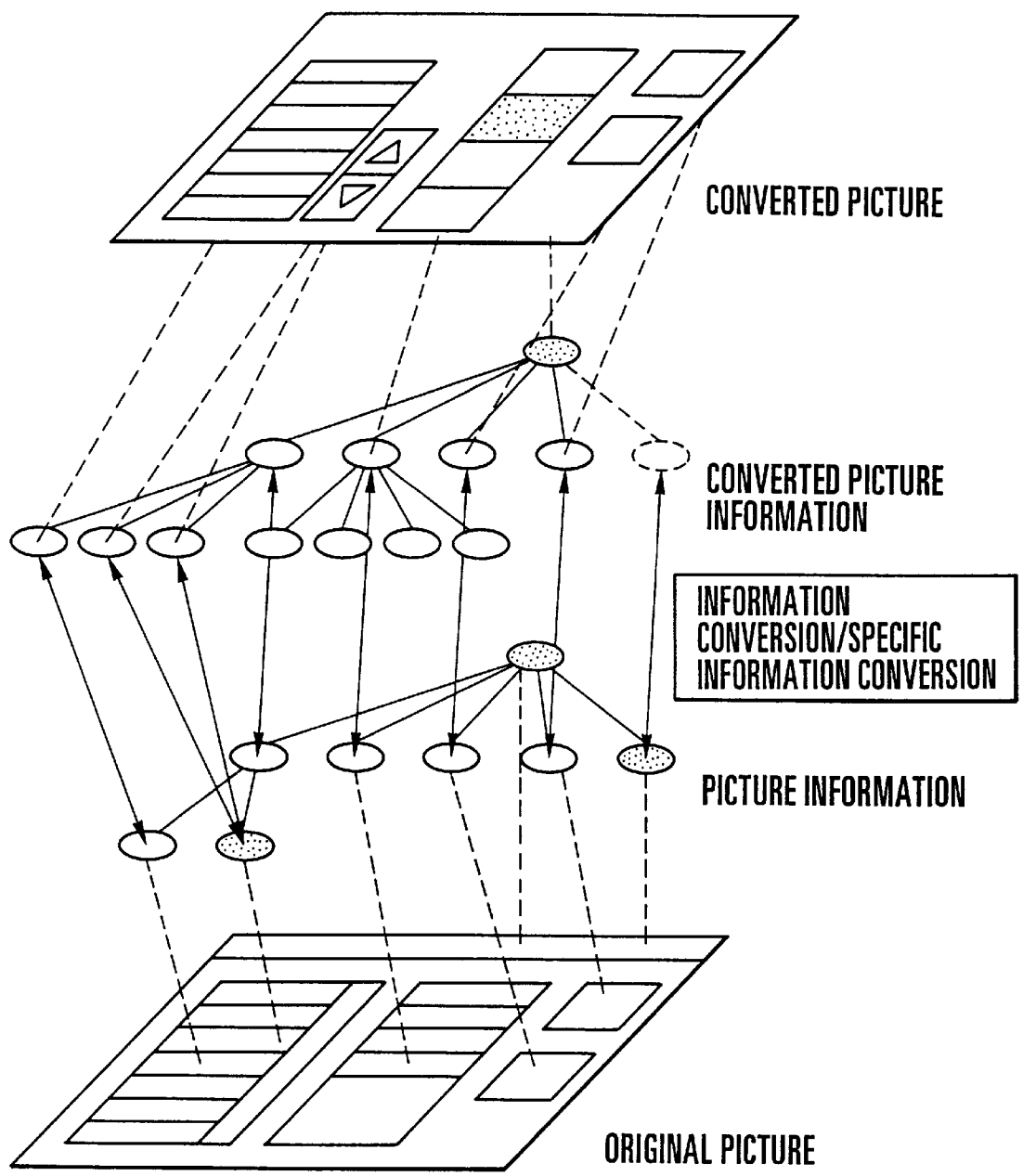
F I G. 9

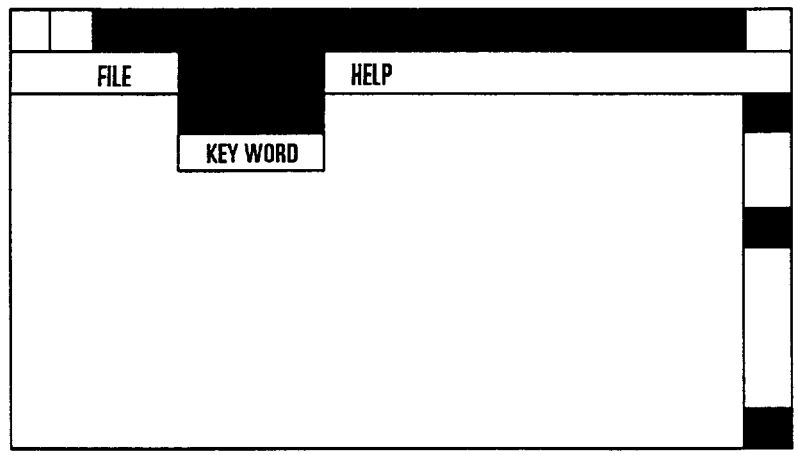
F I G. 20 A
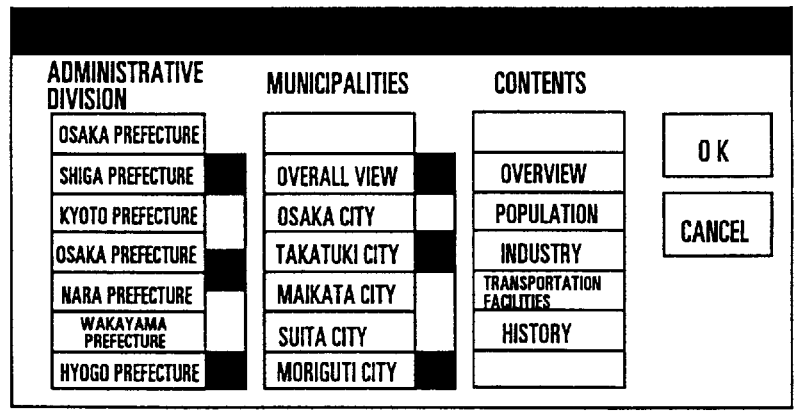
F I G. 20 B
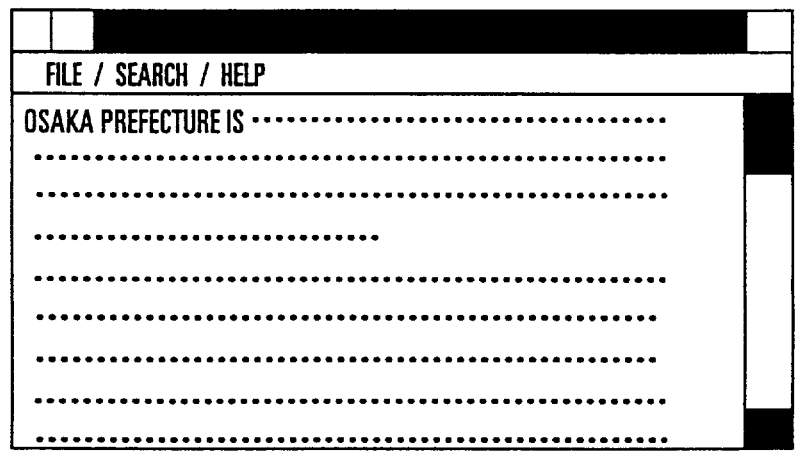
F I G. 20 C

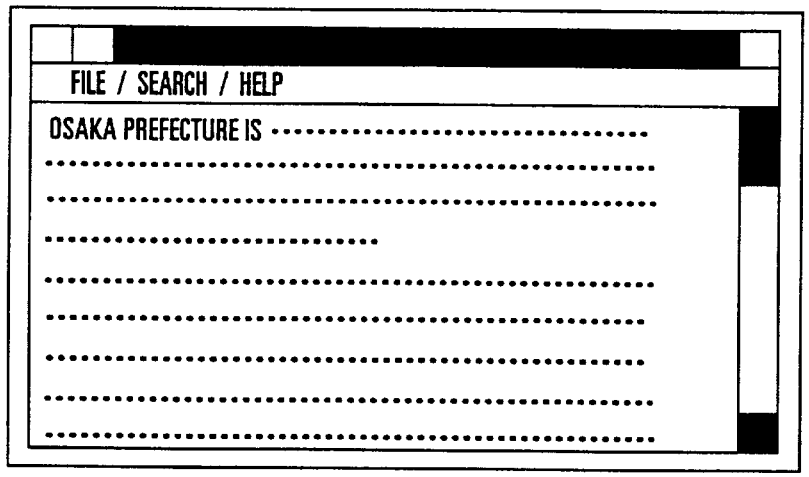
F I G. 22 A
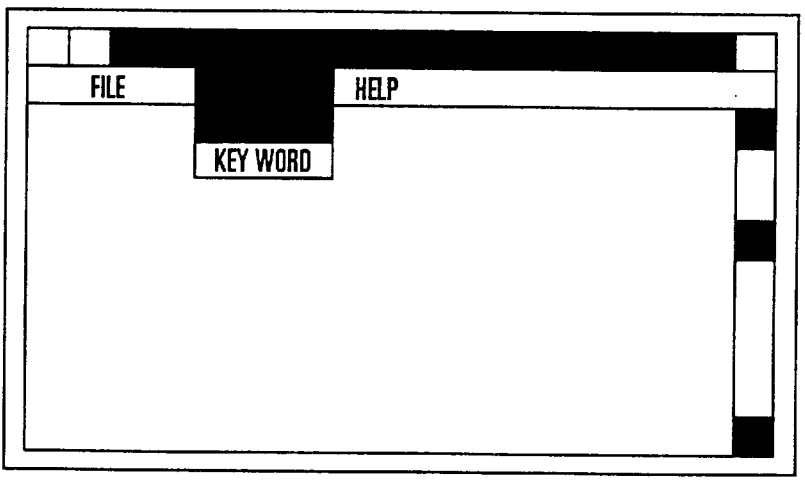
F I G. 22 B
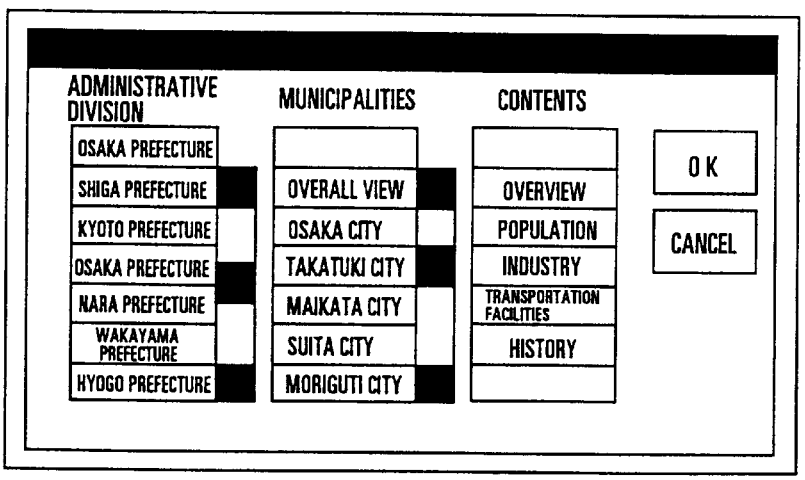
F I G. 22 C

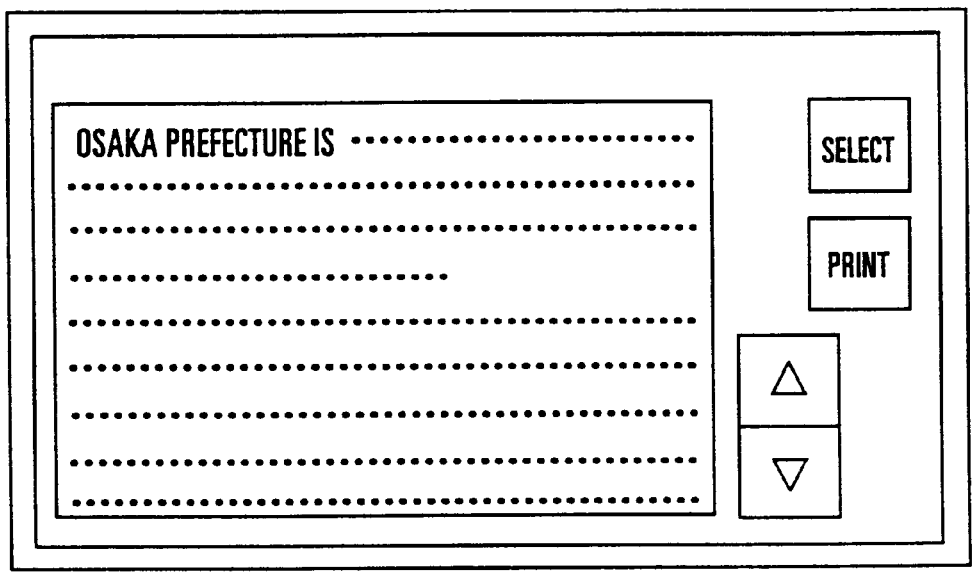
F I G. 24 A
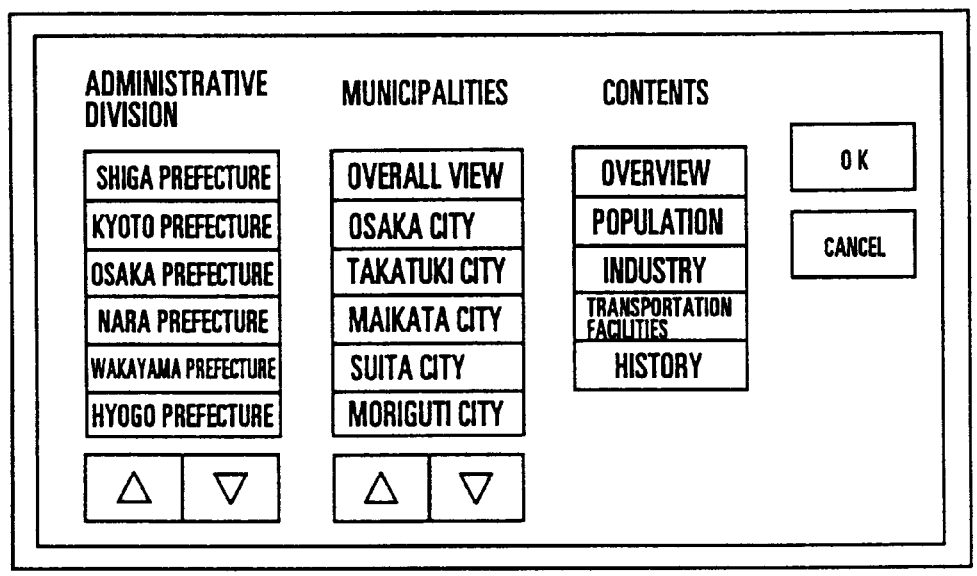
F I G. 24 B

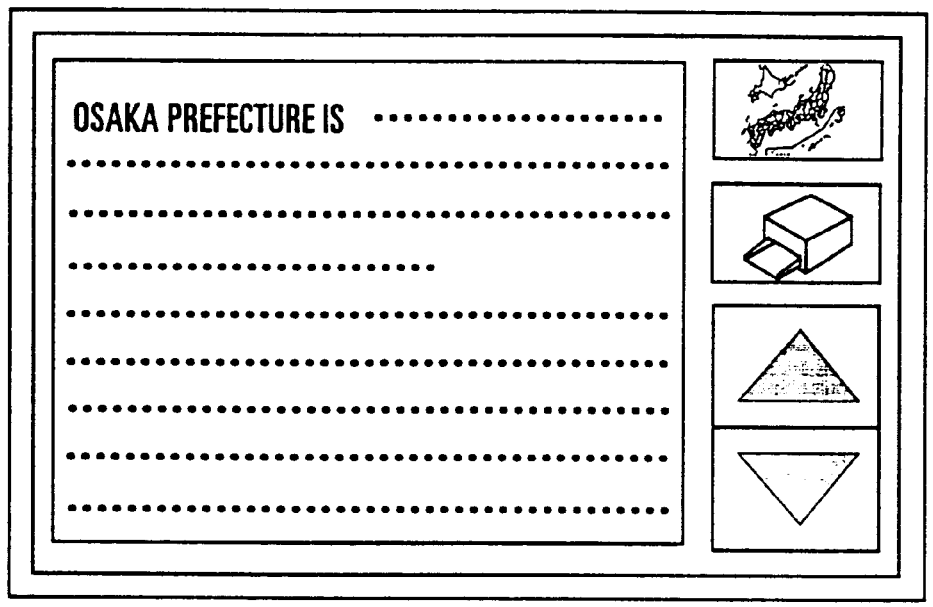
F I G. 26 A
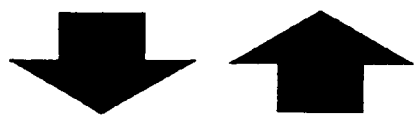
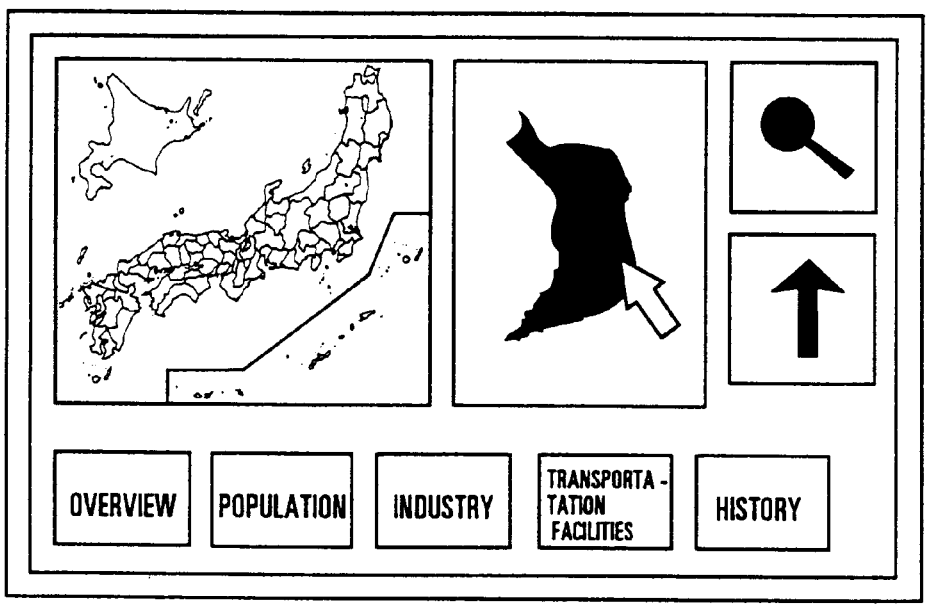
F I G. 26 B

USER INTERFACE CONVERSION METHOD AND APPARATUS

BACKGROUND OF THE INVENTION

The present invention relates to a user interface conversion method and apparatus which can convert an application picture developed on the operating system (OS) of a computer having a graphical user interface (GUI) (to be referred to as a GUI OS hereinafter) into various picture interfaces in accordance with different operation environments and different users and without changing an original application program, more particularly, to a user interface conversion method and apparatus which extract logic information about an original application picture and picture information, and generate converted pictures on the basis of the extracted information, thereby realizing efficient, easy generation of converted pictures.

With the recent widespread use of GUI OSs, an increasing number of applications on public terminals are constructed on the GUI OSs. Even if an application used in a given terminal is to be used in another terminal which uses the same OS as that used in the given terminal, and almost the same functions as those in the existing application are required, the picture interface must be changed depending on the limitations of the functions of the terminal itself and users who differ in age and the like.

According to many conventional applications, to change their picture interfaces, the source programs themselves must be modified. As disclosed in Japanese Patent Laid-Open No. 4-284531, in some methods, an application and picture data are separated, and only the picture data is modified, or only some components such as buttons on a picture are customized. In another known method, components are replaced in a fixed manner upon reference to a prepared picture database, as disclosed in Japanese Patent Laid-Open No. 6-282396.

When an application having the same function as that of an application used in a given environment is to be ported to another environment, its source program and picture data must be modified. It takes a lot of labor and time to make such modification. Furthermore, it is very difficult to perform proper design from the initial design stage for users and an application considering all environments to which porting is expected to be performed.

Even if an existing application is not to be changed, the method of separating an application from its picture data cannot be used for an application which does not employ this structure. According to these methods, all picture data must be newly designed at the time of porting, thus requiring extra labor and time.

The method of changing only some components on a picture is effective only if minor modifications are required, but cannot cope with a case in which the picture layout and expression are to be greatly changed.

In some case, a general-purpose application needs to be used in public terminals in such a manner that a given terminal allows the user to use a specific function, but another terminal inhibits the user from using it. In this case, meticulous support is required, e.g., hiding functions existing on the original picture or preparing functions which do not exist on the original picture to simplify the operational structure. Such modifications are difficult to make.

In addition, public terminals must have the function of coping with visually handicapped users who cannot directly use picture information. This function must be incorporated in existing applications themselves.

SUMMARY OF THE INVENTION

It is the first object of the present invention to provide a user interface conversion method and apparatus which extract only necessary information from original picture information and automatically generating a converted picture without changing an existing application program and requiring the producer of pictures to generate all picture data again.

It is the second object of the present invention to provide a user interface conversion method and apparatus which allow flexible picture conversion by having the function of changing the attribute information of picture information, the function of changing components on a picture, and the function of adding new functional components which do not exist on the original picture.

It is the third object of the present invention to provide a user interface conversion method and apparatus which allow the producer of pictures to modify a specific picture and some interactive components.

It is the fourth object of the present invention to provide a user interface conversion method and apparatus which allow the producer of pictures to interactively perform picture conversion while referring to the original application picture.

It is the fifth object of the present invention to provide a user interface conversion method and apparatus which can present a converted picture interface to visually handicapped users and users of advanced age by using media other than visual media.

In order to achieve the above objects, according to the present invention, there is provided a user interface conversion method of converting a picture interface provided by an application program running on an operating system having a graphical user interface to generate and provide a new picture interface, comprising the steps of acquiring picture information of the application program in response to, as a trigger, a change in the picture provided by the application program, determining a target point in the acquired picture information, generating converted picture information from the determined target point by referring to conversion template information, and displaying a converted picture in accordance with the generated converted picture information.

BRIEF DESCRIPTION OF THE DRAWINGS

FIG. 9 is a view showing the concept of conversion from an original picture to a converted picture in the embodiment;

FIGS. 20A to 20C are views showing examples of the display picture of an AP 102 in the embodiment;

FIGS. 22A to 22C are views showing converted pictures in the current window enlargement display of the AP 102 in the embodiment;

FIGS. 24A and 24B are views showing converted pictures of the AP 102 in the embodiment;

FIGS. 26A and 26B are views showing converted pictures of the AP 102 to be presented to juvenile users in the embodiment;

DESCRIPTION OF THE PREFERRED EMBODIMENT

The present invention will be described in detail with reference to the accompanying drawings.

Figure 1:
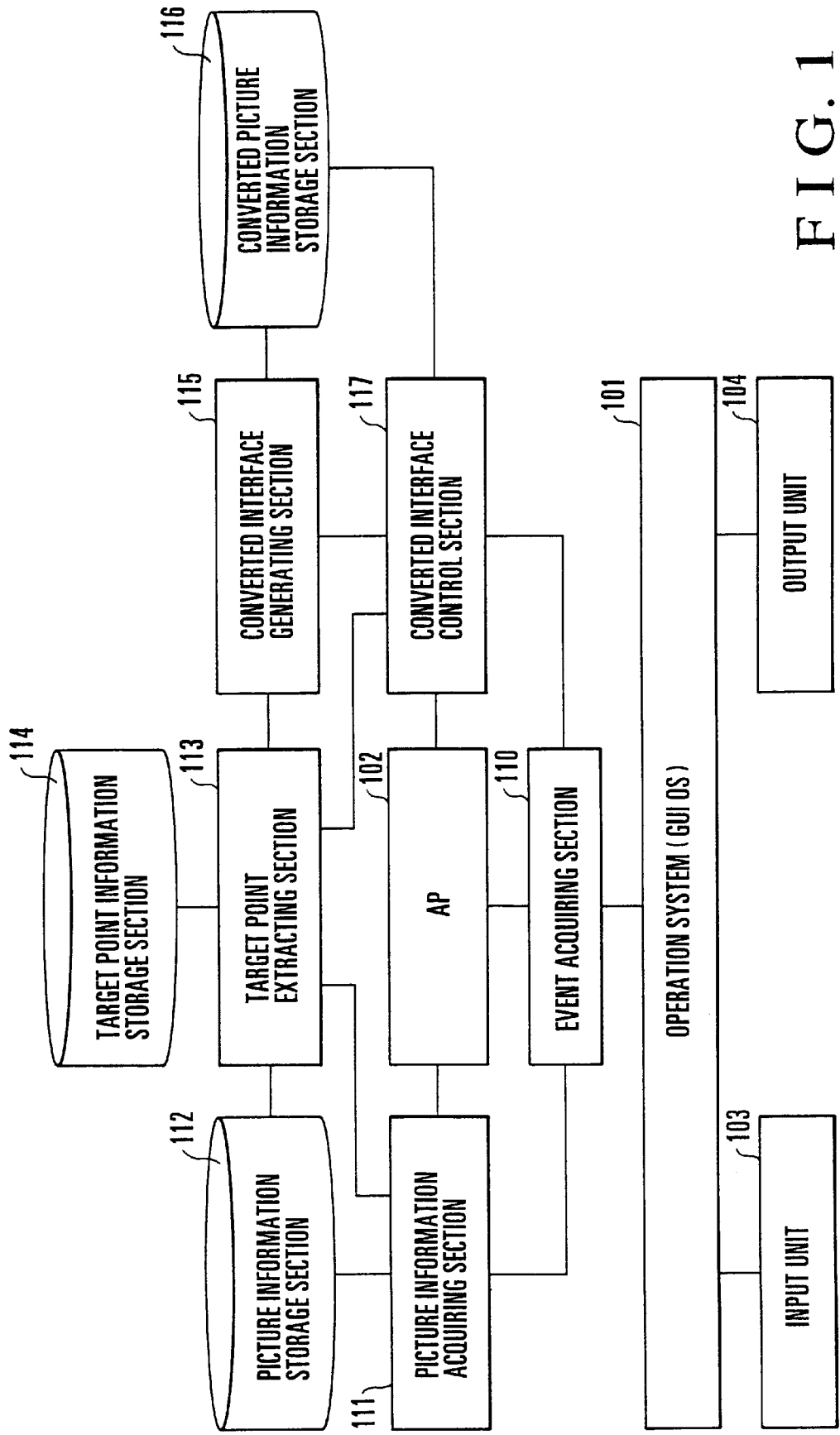
FIG. 1 is a block diagram showing a user interface conversion apparatus according to an embodiment of the present invention.

FIG. 1 shows a user interface conversion apparatus according to an embodiment of the present invention. Referring to FIG. 1, the user interface conversion apparatus of this embodiment includes a GUI OS 101, an application program (to be referred to as an AP hereinafter) 102 which runs on the OS 101, an input unit 103 constituted by a keyboard, a mouse, a touch panel, and the like, an output unit 104 constituted by a display, a speaker, a braille display, a tactile pin display, and the like, an event acquiring section 110, a picture information acquiring section 111, a picture information storage section 112, a target point extracting section 113, a target point information storage section 114, a converted interface generating section 115, a converted picture information storage section 116, and a converted interface control section 117.

Figure 2:
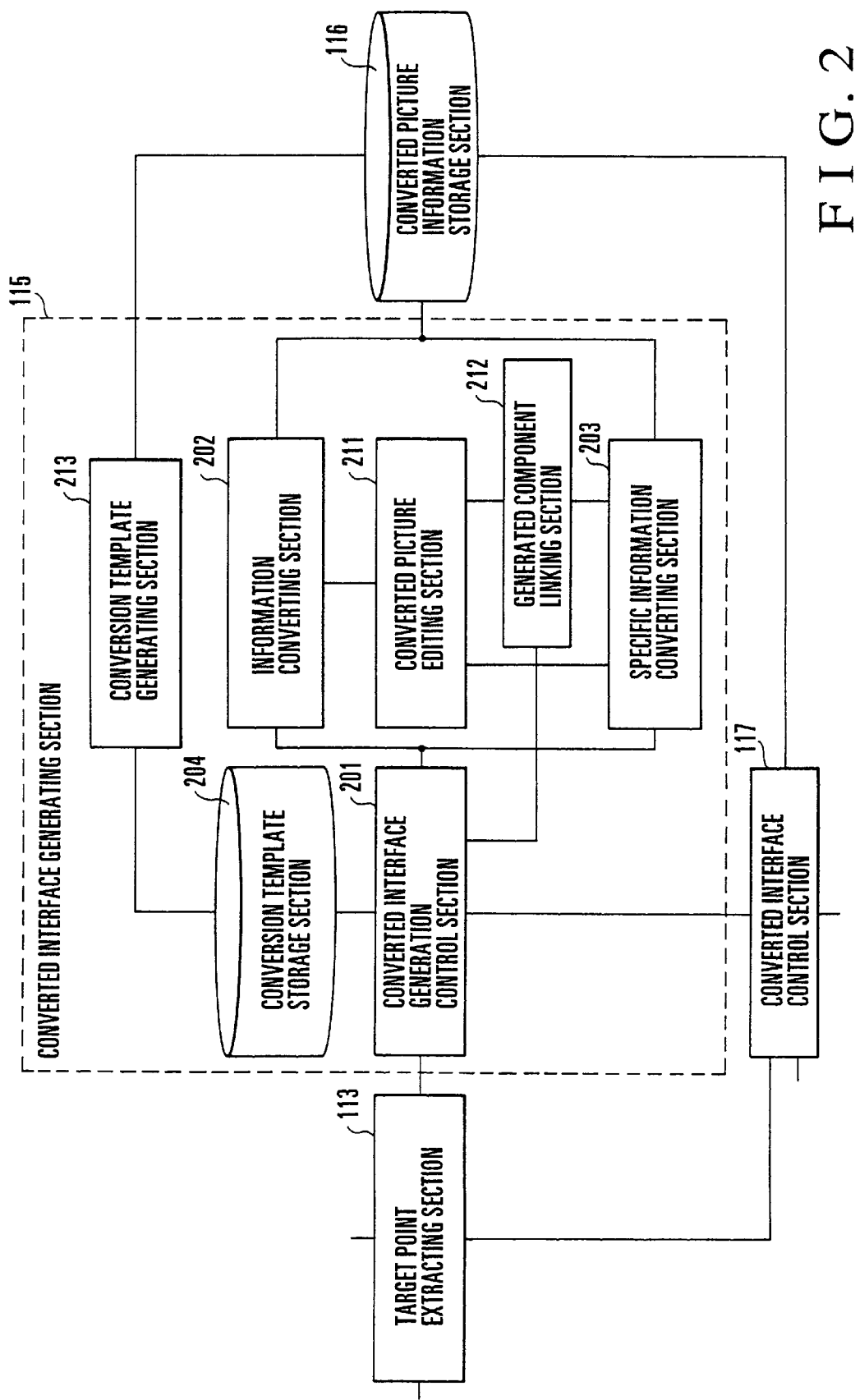
FIG. 2 is a block diagram showing a converted interface generating section in FIG. 1.

The converted interface generating section 115 in FIG. 1 includes a converted interface generation control section 201, an information converting section 202, a specific information converting section 203, a conversion template storage section 204, a converted picture editing section 211, a generated component linking section 212, and a conversion template generating section 213, as shown in FIG. 2.

Figure 3:
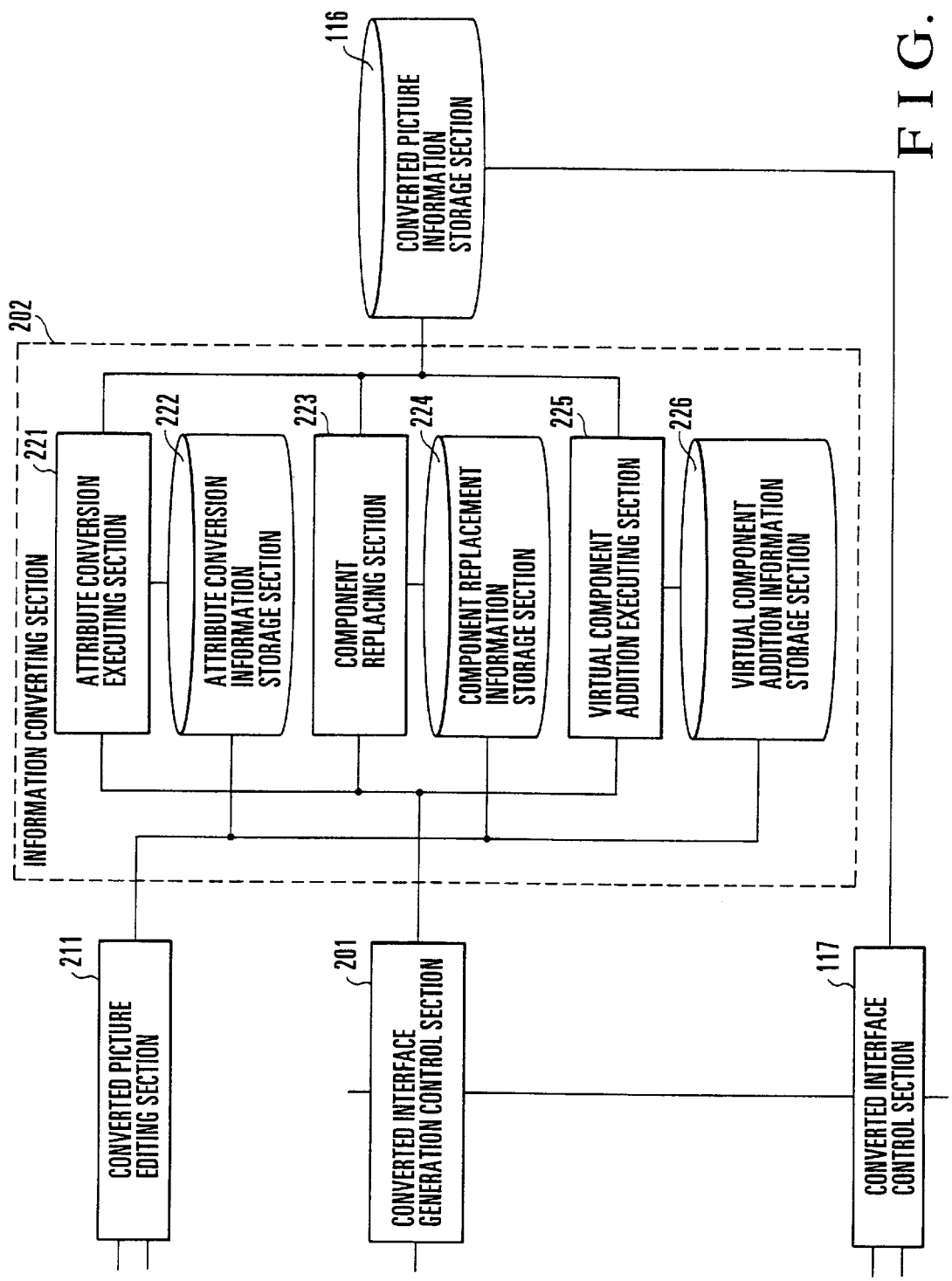
FIG. 3 is a block diagram showing an information converting section in FIG. 2.

The information converting section 202 in FIG. 2 includes an attribute conversion executing section 221, an attribute conversion information storage section 222, a component replacing section 223, a component replacement information storage section 224, a virtual component addition executing section 225, and a virtual component addition information storage section 226, as shown in FIG. 3.

Figure 4:
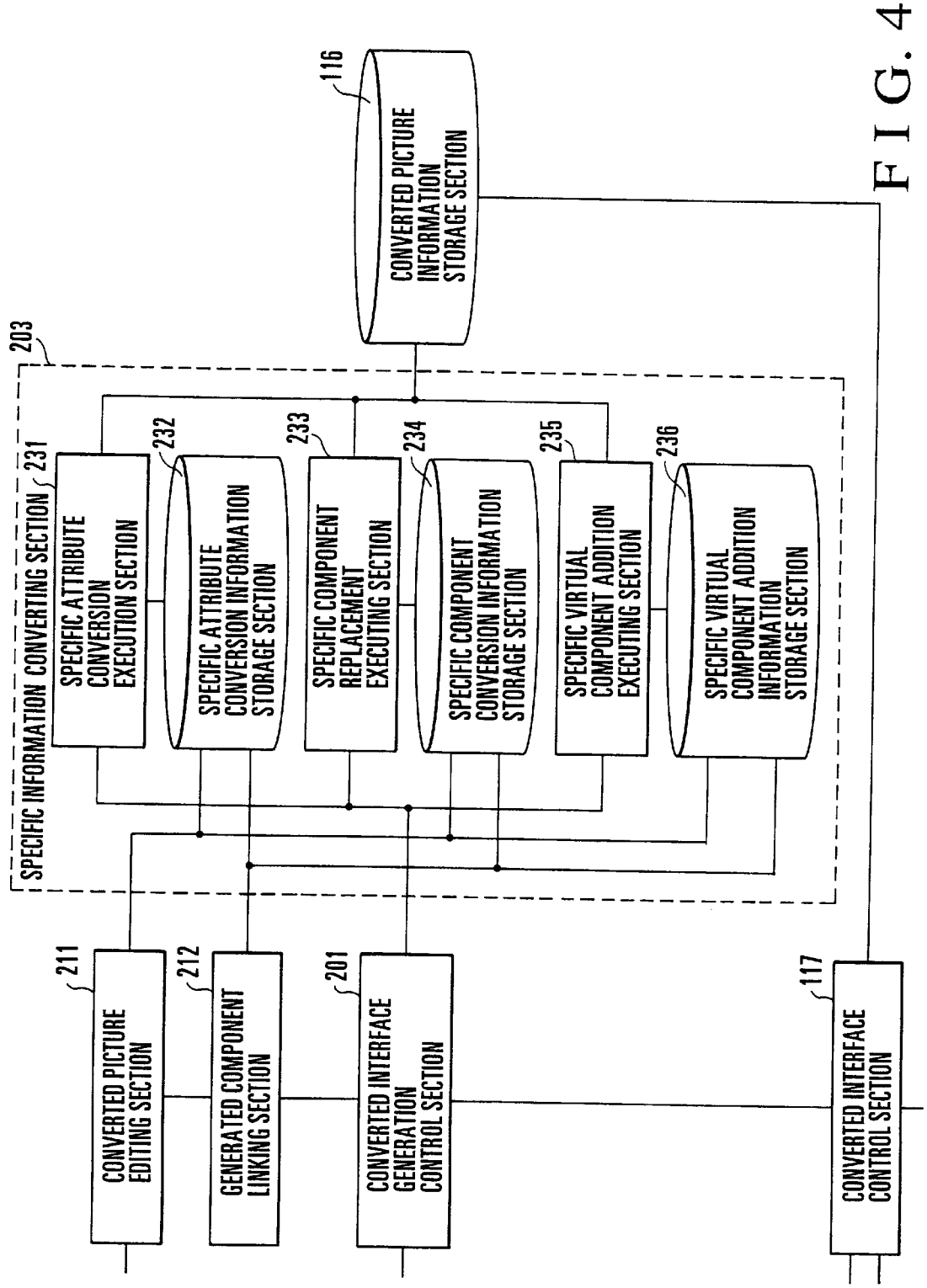
FIG. 4 is a block diagram showing a specific information converting section in FIG. 2.

The specific information converting section 203 in FIG. 2 includes a specific attribute conversion execution section 231, a specific attribute conversion information storage section 232, a specific component replacement executing section 233, a specific component conversion information storage section 234, a specific virtual component addition executing section 235, and a specific virtual component addition information storage section 236, as shown in FIG. 4.

Figure 5:
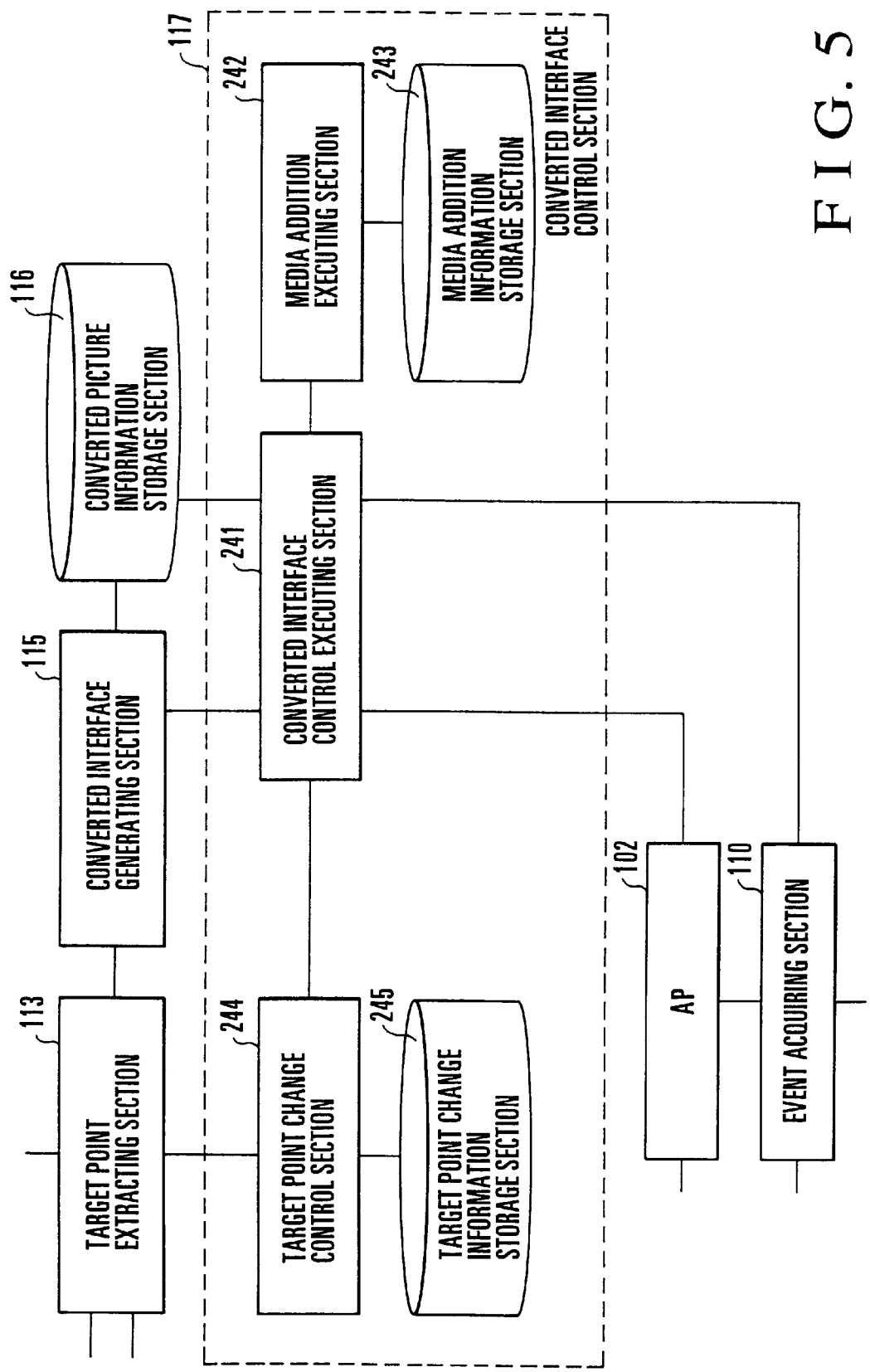
FIG. 5 is a block diagram showing a converted interface control section in FIG. 1.

The converted interface control section 117 in FIG. 1 includes a converted interface control executing section 241, a media addition executing section 242, a media addition information storage section 243, a target point change control section 244, and a target point change information storage section 245, as shown in FIG. 5.

The operation of the apparatus of this embodiment in two modes, i.e., the normal mode and the change mode, will be described next.

Figure 6:
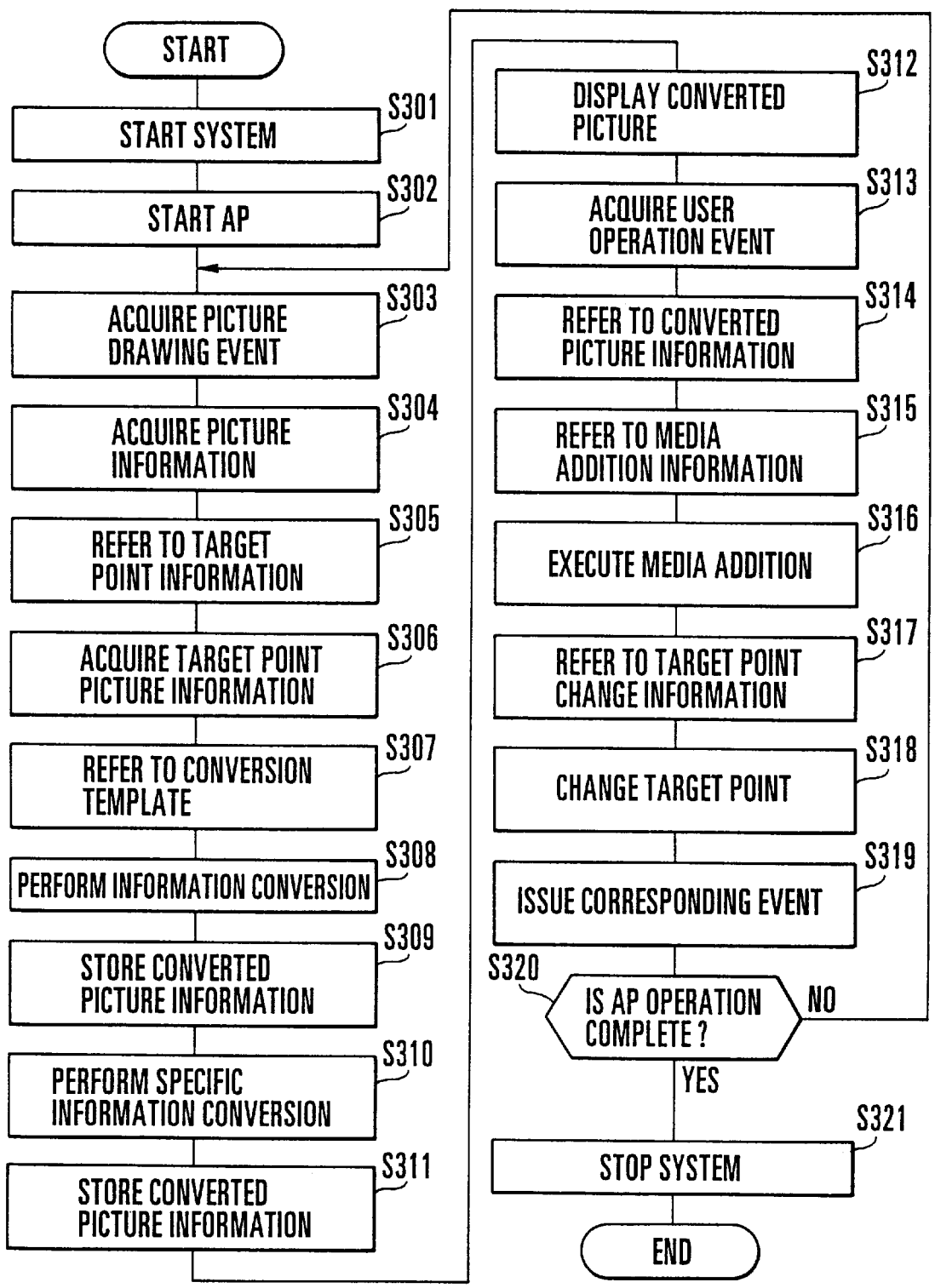
FIG. 6 is a flow chart for explaining the operation of the user interface conversion apparatus in the normal mode.

The operation of the apparatus in the normal mode will be described first with reference to the flow chart of FIG. 6. After the apparatus is started on the OS 101 (step S301), the AP 102 is started (step S302). When the AP 102 is started, the window of the AP 102 opens. At this time, a picture drawing event occurs. The event acquiring section 110 acquires this event (step S303), and transfers it to the picture information acquiring section 111.

Figure 7A:
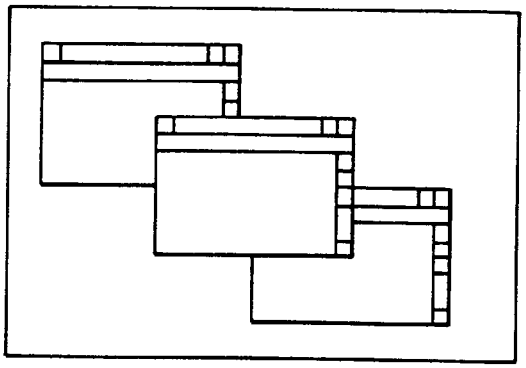
FIGS. 7A and 7B are views showing picture information extracted from a display picture in the embodiment.
Figure 7B:

The picture information acquiring section 111 is triggered by the event from the event acquiring section 110 to acquire picture information constituted by logic structure information indicating the configurations of the window displayed on the picture and interactive components such as a menu, buttons, and the like on the window, layout information indicating the positions and sizes of the interactive components, and attribute information about the captions (item names) and focus states of the interactive components (step S304). The picture information acquiring section 111 stores the acquired information in the picture information storage section 112. FIGS. 7A and 7B show examples of the display picture and the picture information displayed at this time. The picture information has a tree structure.

Figure 8:
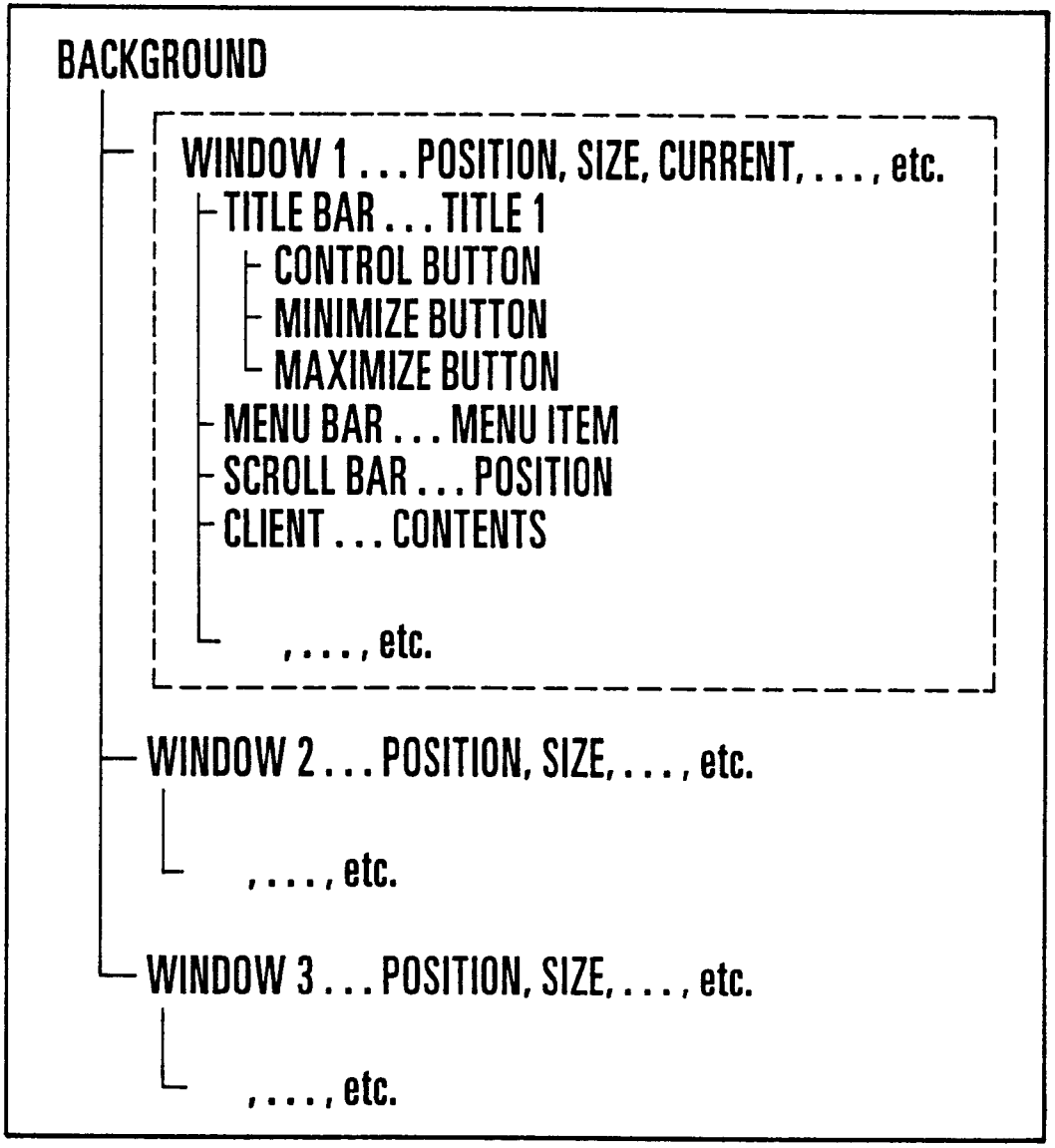
FIG. 8 is a view showing an example of target point picture information in the embodiment.

When the picture information is acquired, the target point extracting section 113 refers to the target point information in the target point information storage section 114 (step S305) and extracts target point picture information from the picture information stored in the picture information storage section 112 (step S306). Target point information as reference information designates the sub-tree structure of target interactive components from the tree structure of the picture information. For example, a target application window, a current window, a focused interactive component, and the like can be designated. In contrast to this, target point information can be used to designate interactive components and items which the user is inhibited from operating. FIG. 8 shows an example of the target point picture information obtained at this time. In this case, the current window is designated, and the inhibition of a title bar operation is designated.

The extracted target point picture information is sent to the converted interface generation control section 201 (FIG. 2) of the converted interface generating section 115. The converted interface generation control section 201 refers to the conversion template in the conversion template storage section 204 (step S307) and controls the information converting section 202 and the specific information converting section 203, thereby performing picture conversion.

The attribute conversion executing section 221, the component replacing section 223, and the virtual component addition executing section 225 of the information converting section 202 in FIG. 3 respectively refer to the attribute conversion information in the attribute conversion information storage section 222, the component replacement information in the component replacement information storage section 224, and the virtual component addition information in the virtual component addition information storage section 226 to perform information replacement under the control of the converted interface generation control section 201 (step S308). The attribute conversion executing section 221 performs conversion, e.g., changing the size and position of a component and changing a caption. The component replacing section 223 performs conversion, e.g., changing an interactive component such as a button to another button display. The virtual component addition executing section 225 sets an interactive component which does not actually exist on the picture. Replacement of these pieces of information will be described later with reference to examples of conversion.

When the above conversion processing is complete, the conversion result obtained by the information converting section 202 is stored as converted picture information in the converted picture information storage section 116 (step S309). The stored converted picture information has a tree structure constituted by logic structure information indicating the configurations of the window displayed on the converted picture and interactive components such as a menu and buttons on the window, layout information indicating the positions and sizes of the interactive components, attribute information about the captions (item names) and focus states of the interactive components, and information about links between the interactive components in the picture information and corresponding events.

The specific attribute conversion execution section 231, the specific component replacement executing section 233, and the specific virtual component addition executing section 235 of the specific information converting section 203 in FIG. 4 respectively refer to the specific attribute conversion information in the specific attribute conversion information storage section 232, the component replacement information in the specific component conversion information storage section 234, and the specific virtual component addition information in the specific virtual component addition information storage section 236 to perform specific information conversion under the control of the converted interface generation control section 201 (step S310). Specific information conversion is conversion which is performed for only a given interactive component on a given picture.

The specific attribute conversion execution section 231 performs conversion, e.g., changing the size and position of a specific component and changing a caption. The component replacing section 223 performs conversion, e.g., changing a specific interactive component such as a button into another button display. The specific virtual component addition executing section 235 sets an interactive component, which does not actually exist on the picture, on a specific picture. Conversion of these pieces of specific information will be described later with reference to examples of conversion.

When the above specific information conversion is complete, the conversion result obtained by the specific information converting section 203 is stored as converted picture information in the converted picture information storage section 116 (step S311). The stored converted picture information has a tree structure constituted by logic structure information indicating the configurations of the window displayed on the converted picture and interactive components such as a menu and buttons on the window, layout information indicating the positions and sizes of the interactive components, attribute information about the captions (item names) and focus states of the interactive components, and information about links between the interactive components of the picture information and corresponding events.

When the above conversion is complete, the converted interface control executing section 241 of the converted interface control section 117 in FIG. 5 displays the converted picture on the display of the output unit 104 on the basis of the converted picture information in the converted picture information storage section 116 (step S312). In this case, if the display of the original picture is not designated, only the converted picture is displayed, as a result of the conversion. FIG. 9 shows the relationship between the original picture, the picture information, the converted picture information, and the converted picture.

The user operates on the converted picture through the input unit 103 in FIG. 1. The event acquiring section 110 acquires an operation event from the input unit 103 (step S313), and transfers it to the converted interface control executing section 241 of the converted interface control section 117 in FIG. 5. The converted interface control executing section 241 refers to the converted picture information in the converted picture information storage section 116 (step S314), and sends the event and corresponding interactive component information to the media addition executing section 242. The media addition executing section 242 refers to the media addition information in the media addition information storage section 243 (step S315) to designate a corresponding computer-generated voice, a sound effect, braille pin display, tactile pin display, or the like on the output unit 104 (step S316). At this time, the target point change control section 244 refers to the target point change information in the target point change information storage section 245 (step S317) and notifies the target point extracting section 113 of the change of the target point, as needed (step S318).

The converted interface control executing section 241 issues a corresponding event to the AP 102 on the basis of the converted picture information to which the section 241 has referred (step S319). The AP 102 receives the event from the converted interface control executing section 241 to check whether the AP operation is complete (step S320). If a re-drawing operation is performed without terminating the AP operation, the above operation from the acquisition of picture drawing event (step S303) is repeated. If it is determined in step S320 that the AP 102 is stopped, the system is terminated (step S321).

Assume that the AP 102 which runs on the OS 101 is a program for searching for various information about various areas of Japan through a public terminal in facilities such as a library. This program will be described in more detail with reference to examples of the converted picture. Assume that this system has an information conversion function requiring the parameters shown in the following table.

| Attribute Conversion | Window Enlargement | window identifier list of designated non-use components list of non-use items conversion coordinates conversion size |
| --- | --- | --- |
| | Component Enlargement | component identifier list of non-use items conversion coordinates conversion size |
| | Caption Conversion | conversion dictionary conversion bit map dictionary |
| Replacement Component | Scroll Button | coordinates size caption |
| | List Button | coordinates size item list list of non-use items |
| Virtual Component | Source/destination Window | coordinates size |
| Specific Attribute Conversion | Caption Conversion | window identifier component identifier caption before conversion caption after conversion |
| Specific Replacement Component | Map of Japan | window identifier component identifier coordinates size |
| | Local Map | window identifier component identifier coordinates size |
| Specific Virtual Component | Macro Button | window identifier component identifier caption coordinates size event to be issued |

Figure 10:
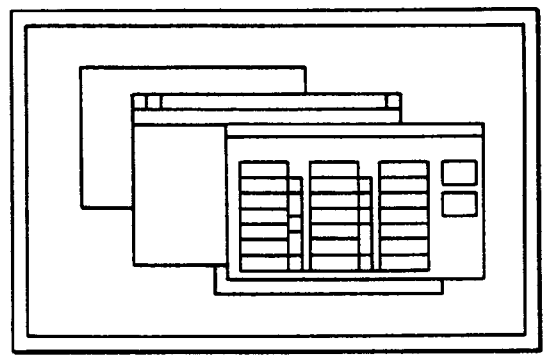
FIGS. 10A and 10B are views showing an example of "attribute conversion-window enlargement" in the embodiment.
Figure 10:
Figure 10:
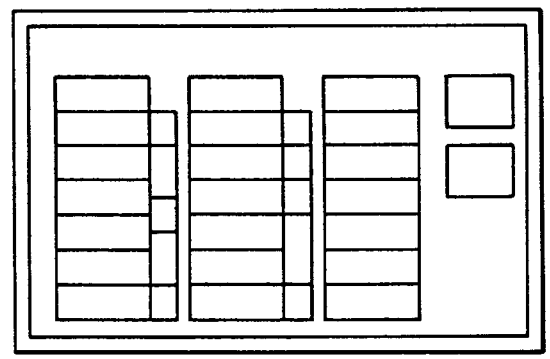

In "attribute conversion-window enlargement", as shown in FIGS. 10A and 10B, a given window is enlarged (or reduced) in accordance with a designated size and a designated position. In general, a window at a target point is enlarged/displayed. In this case, the use of the title bar is inhibited, and the title bar is not displayed.

Figure 11:
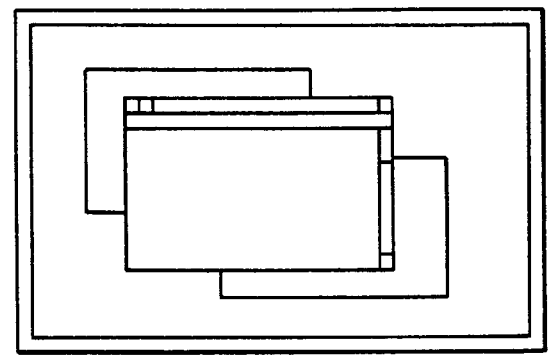
FIGS. 11A and 11B are views showing an example of "attribute conversion-component enlargement" in the embodiment.
Figure 11:
Figure 11:
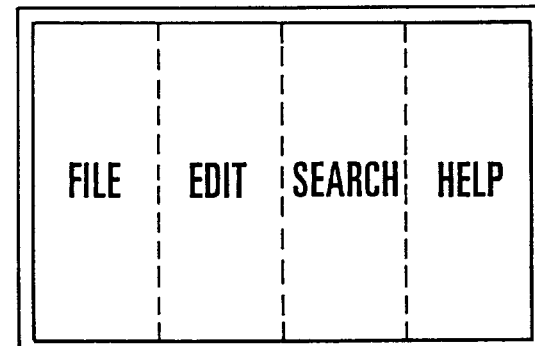

In "attribute conversion-component enlargement", as shown in FIGS. 11A and 11B, a designated component is enlarged (or reduced) in accordance with a designated size and a designated position. In this case, the menu bar is designated.

Figure 12:
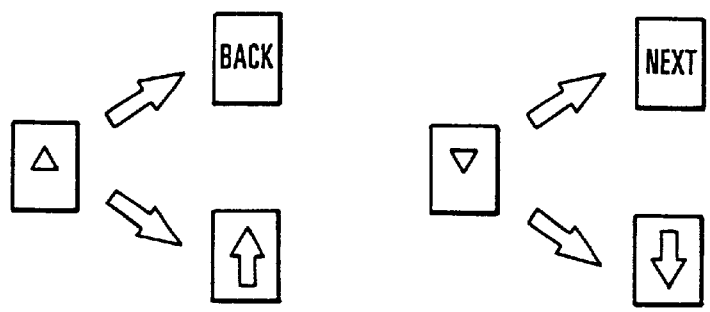
FIGS. 12A and 12B are views showing an example of "attribute conversion-caption conversion" in the embodiment.

In "attribute conversion-caption conversion", as shown in FIGS. 12A and 12B, a given caption is converted into another name or bit map upon reference to a dictionary. In this case, the bit maps of the replacement component-scroll buttons are converted into the characters "back" and "next" and other bit maps.

Figure 13:
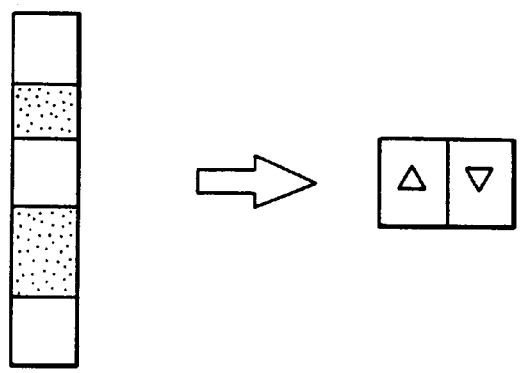
FIG. 13 is a view showing an example of conversion in "replacement component-scroll button" in the embodiment.

In "replacement component-scroll button", as shown in FIG. 13, a scroll bar is replaced. In this case, the function of displaying preceding/following page upon depression of one of the buttons is realized.

Figure 14:
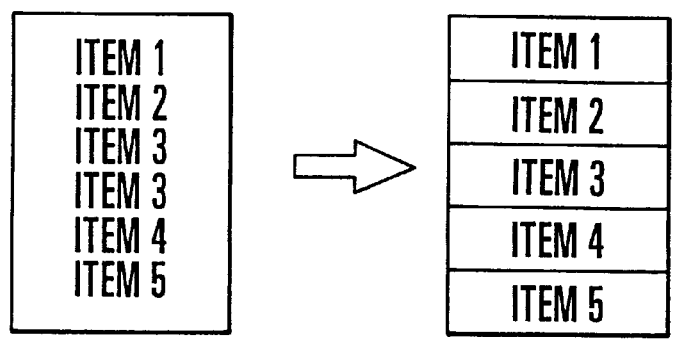
FIG. 14 is a view showing an example of conversion in "replacement component-list button" in the embodiment.

In "replacement component-list button", as shown in FIG. 14, a list box is replaced with buttons for displaying list items.

Figure 15:
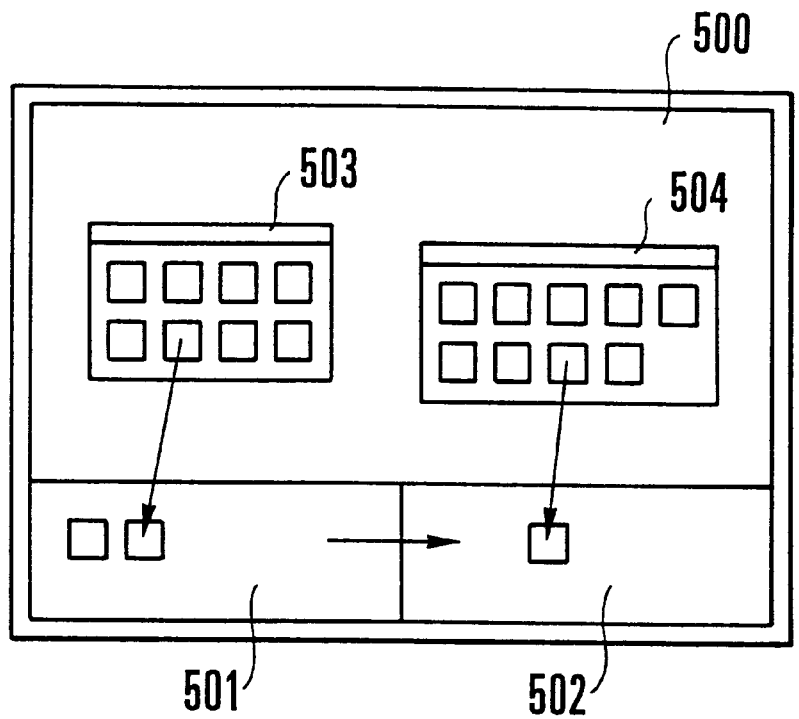
FIG. 15 is a view showing an example of conversion in "virtual component-source/destination window" in the embodiment.

"Virtual component-source/destination window" is an example of the function of setting a component, which does not actually exist on the original picture, on the converted picture. FIG. 15 shows a drag-and-drop operation which is a characteristic feature of the GUI operation. More specifically, two virtual interactive components 501 and 502 for a drag-and-drop operation are arranged on the picture to allow an inexperienced user to easily perform a drag-and-drop operation for a plurality of files.

In step S305, the target point information in the target point information storage section 114 to which the target point extracting section 113 refers designates a background (desktop) 500. With this operation, the designated sub-tree includes all the picture information, and all the displayed interactive components can be operated.

When this target point picture information is sent to the converted interface generation control section 201 of the converted interface generating section 115, the converted interface generation control section 201 refers to the conversion template in the conversion template storage section 204 (step S307) to control the information converting section 202 and the specific information converting section 203 so as to perform picture conversion. In this case, the conversion template designates the placement of the source window 501 and the destination window 502 as virtual components at the lower part of the picture.

With this operation, the virtual component addition executing section 225 of the information converting section 202 acquires component information about the source window 501 and the destination window 502 as the corresponding virtual components and virtual component addition information constituted by corresponding event information from the virtual component addition information storage section 226, and generates information for drawing a source window 503 and a destination window 504 at the positions designated by the template (step S308). The virtual component addition executing section 225 then sends the information to the converted picture information storage section 116.

When the above conversion is complete, the converted interface control executing section 241 of the converted interface control section 117 displays the converted picture on the display of the output unit 104 on the basis of the converted picture information in the converted picture information storage section 116 (step S312). In this case, since the background is designated by the target point information, the original picture is also displayed. Even if the user operates on the picture afterward, the converted picture display shown in FIG. 15 is maintained with only a change in the desktop being reflected thereon.

The user uses the virtual components as follows. First of all, the user temporarily drags a plurality of necessary files one by one from the window 503 or the like to the source window 501, or drags a target folder from the window 504 or the like to the destination window 502. The user then designates the execution of "move" or "copy" from the source window 501 to the destination window 502, thereby moving or copying the files.

Figure 16A:
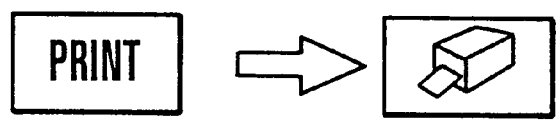
FIGS. 16A to 16C are views showing examples of "specific attribute conversion-caption conversion" in the embodiment.
Figure 16B:
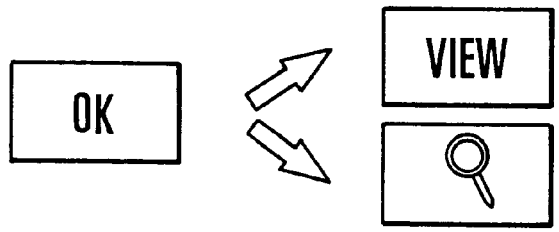
Figure 16C:
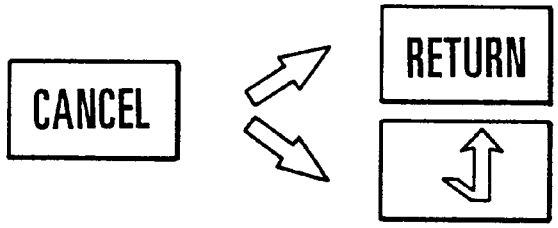

In "specific attribute conversion-caption conversion", as shown in FIGS. 16A to 16C, the captions of given interactive components in a specific window are converted. In this case, the captions of the "print", "OK", and "cancel" buttons in a given window are converted into bit maps and the captions "view" and "return".

Figure 17A:
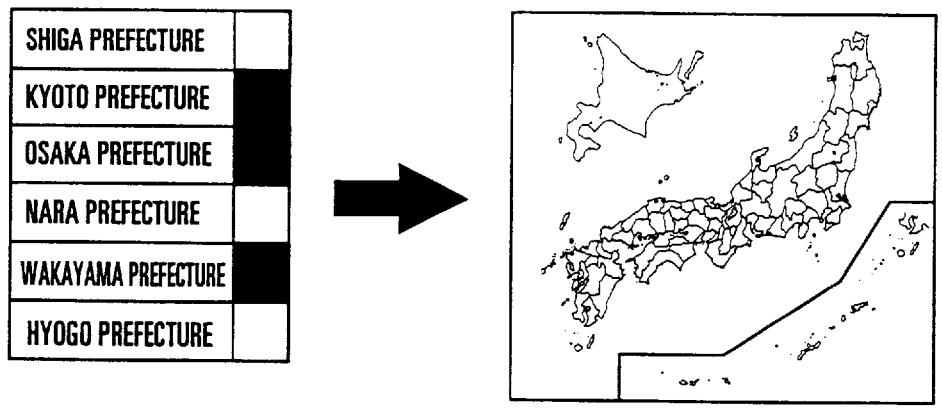
FIGS. 17A and 17B are views showing examples of conversion in "specific replacement component-map of Japan/local map" in the embodiment.
Figure 17B:
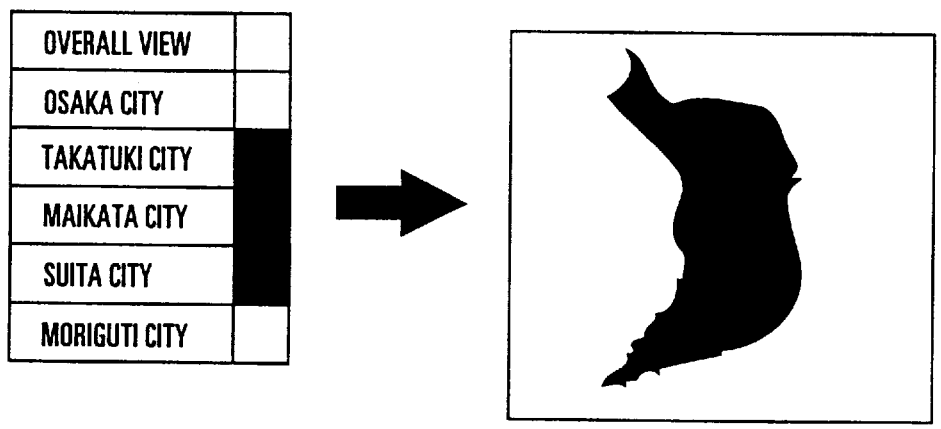

In "specific replacement component-map of Japan/local map", as shown in FIGS. 17A and 17B, a list in a specific window like a list including the names of administrative divisions and local areas are converted into bit maps of maps.

Figure 18:
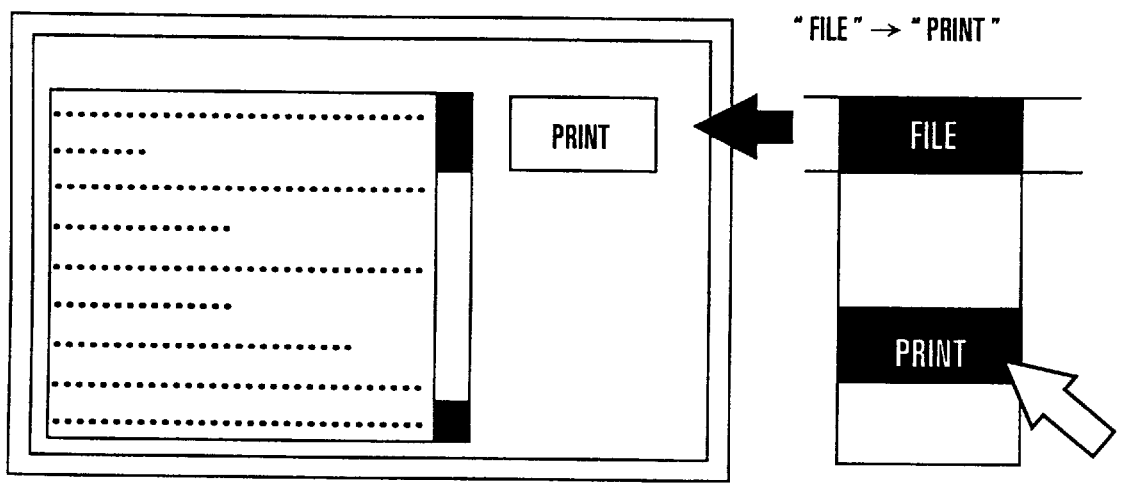
FIG. 18 is a view showing an example of conversion in "specific virtual component-macro button" in the embodiment.
Figure 19A:
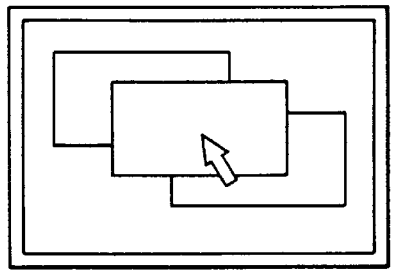
FIGS. 19A to 19E are views showing converted pictures to be presented to visually handicapped users in the embodiment.
Figure 19B:
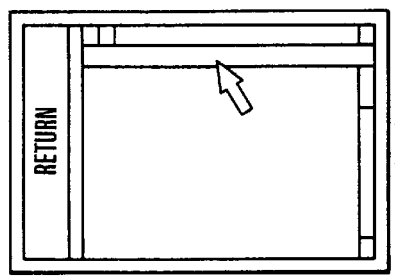
Figure 19C:
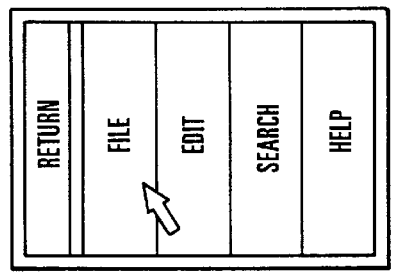
Figure 19D:
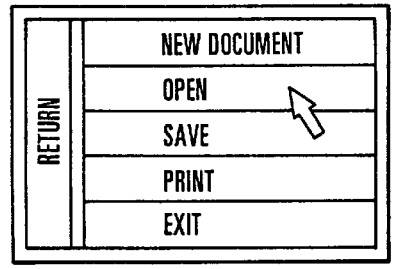
Figure 19F:
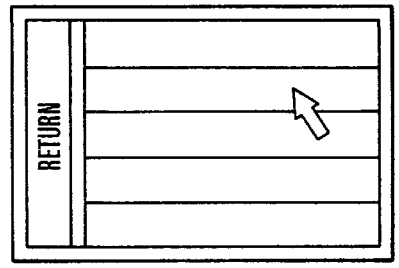
Figure 19E:
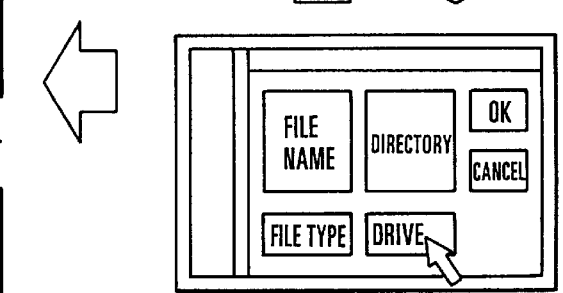

In "specific virtual component-macro button", as shown in FIG. 18, a function which is not displayed on a given picture is executed by assigning a button having a macro function to a specific picture. In this case, of the items in the menu bar designated as a component not to be used, an execution function of "file"→"print" is assigned as a "print" button.

FIGS. 19A to 19F show examples of picture conversion in which the above information conversion and control performed by the target point change control section 244 on the basis of the target point change information in the target point change information storage section 245 allow a visually handicapped user to perform a GUI operation by using a touch panel or the like as the input unit 103. In this case, according to the target point information, the initial target point is set on the background in FIG. 19A, and the target point is changed to the window in FIG. 19B, the menu bar in FIG. 19C, the pull-down menu in FIG. 19D, the dialog box in FIG. 19E, and the combo box in FIG. 19F in accordance with the operation performed by the user. In this case, item names and operation results are fed back by the media addition executing section 242 with voices, braille display, and the like to allow the user to perform a GUI operation without considering interactive components in detail.

An example of the AP 102 in this embodiment will be described with reference to the pictures shown in FIGS. 20A to 20C.

The AP 102 is a program for searching out data about the populations, industries, and the like of administrative divisions and municipalities of Japan from a database on a network, a CD-ROM, or the like and displaying the searched-out data. Such a program provides high general versatility of data and allows various users to make the most of the data. In this case, this program is generated by using standard interactive components on the OS 101.

As shown in FIG. 20A, the menu items include "file", "search", and "help". When "file" is selected, the items "open", "save", "print", "print setup", and "exit" are displayed on the pull-down menu. When "search in division" is selected, a dialog box for setting search conditions is displayed, as shown in FIG. 20B. When items as search conditions are set, corresponding data is displayed as shown in FIG. 20C.

Figure 21:
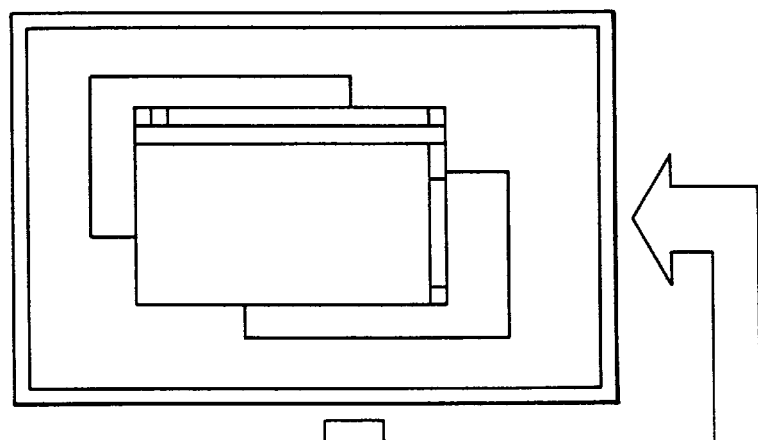
FIGS. 21A to 21C are views showing examples of the display picture of the AP 102 when it is used in the embodiment.
Figure 21:
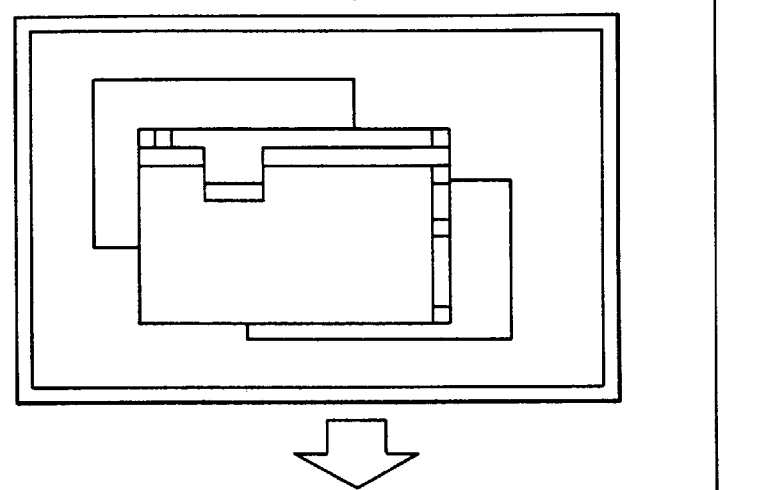
Figure 21:
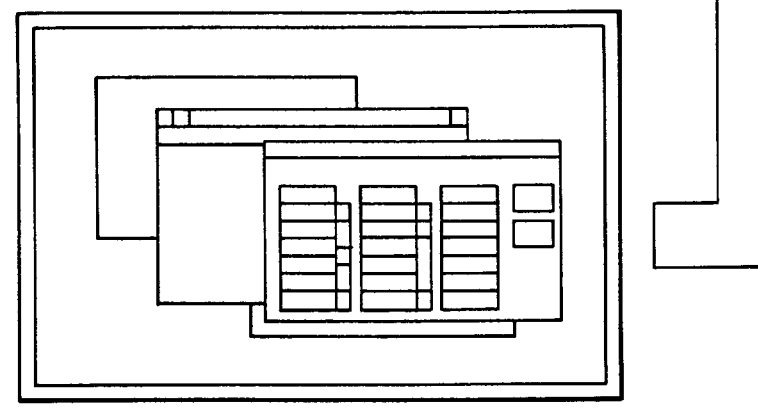

Each of FIGS. 21A to 21C shows an example of the picture displayed when the AP 102 is used on the OS 101 by a general method. "Search in division" is selected on the menu in FIG. 21B from the data display picture in FIG. 21A, and necessary items are set on the dialog box in FIG. 21C. The corresponding data is displayed on the picture in FIG. 21A.

In many cases, an application on a public terminal inhibits the user from operating another application or performing operations such as "exit" and "setup" of the application. To allow the user to perform such operations on a general-purpose application, a current window is set in target point information, and setting is made to always display the current window in the maximum size in "attribute conversion-window enlargement". FIGS. 22A to 22C show the resultant displays.

Figure 23:
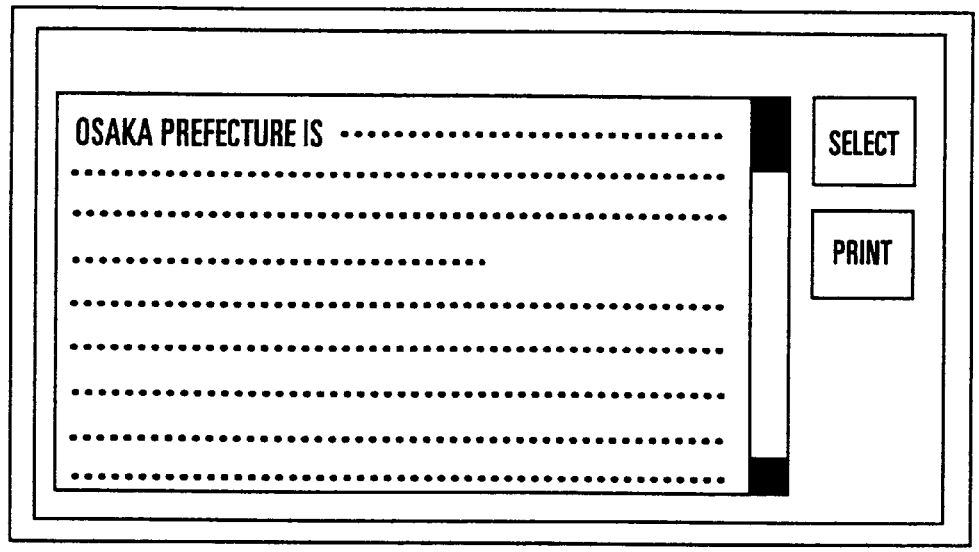
FIGS. 23A and 23B are views showing converted pictures of the AP 102 in the embodiment.
Figure 23:
Figure 23:
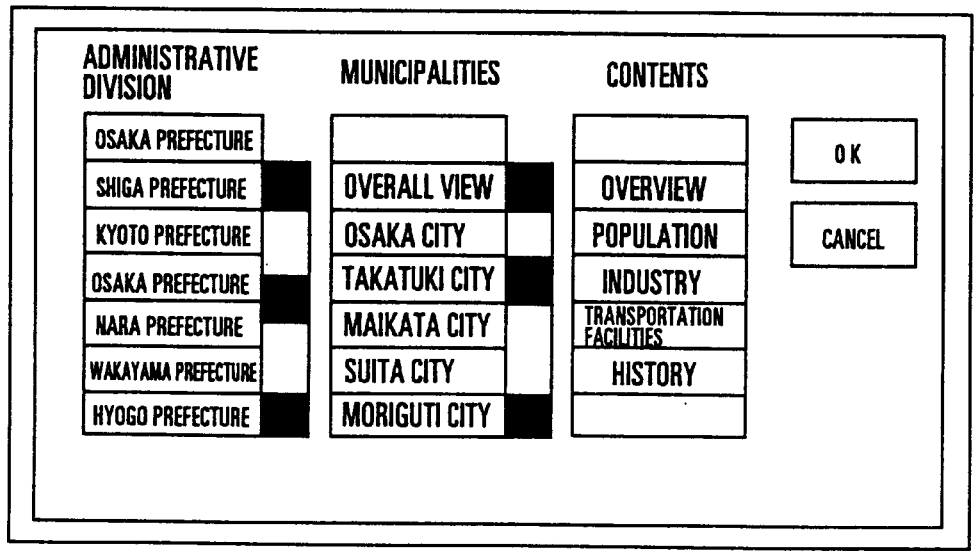

To prevent the user from becoming conscious of the OS and operating a window operation, the display of the title bar and the menu bar is inhibited, and "specific virtual component-macro button" is set to display only the "search in division" and "print" functions. FIGS. 23A and 23B show the resultant displays. FIGS. 24A and 24B show the displays obtained by replacing the scroll bar with "replacement component-scroll bar button", assuming an operation with a touch panel or the like.

Figure 25:
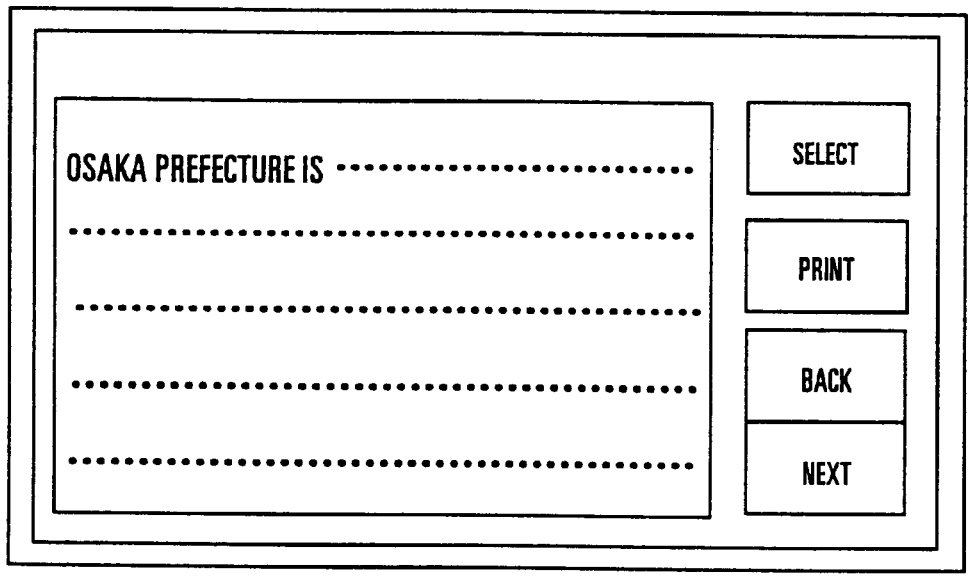
FIGS. 25A and 25B are views showing converted pictures of the AP 102 to be presented to users of advanced age in the embodiment.
Figure 25:
Figure 25:
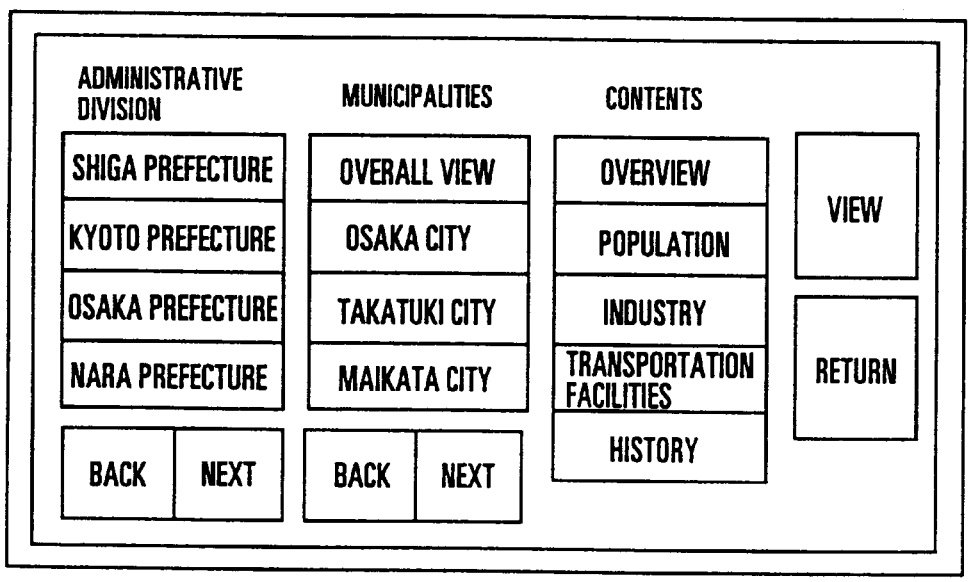

Referring to FIGS. 25A and 25B, assuming the use of the program by a user of advanced age, the display size is increased by "attribute conversion-component enlargement", and the captions of buttons are changed by "specific attribute conversion-caption conversion" as follows: from "search" to "select"; from "Δ" to "back"; from "∇" to "next"; from "OK" to "view"; and from "cancel" to "return". In addition, a feedback operation is performed with voices by the media addition function.

Referring to FIGS. 26A and 26B, assuming the use of the program by a juvenile user, captions and lists are converted into bit maps by "specific attribute conversion-caption conversion" and "specific replacement component-map of Japan/local map". In addition, sound effects are fed back by the media addition function.

Figure 27A:
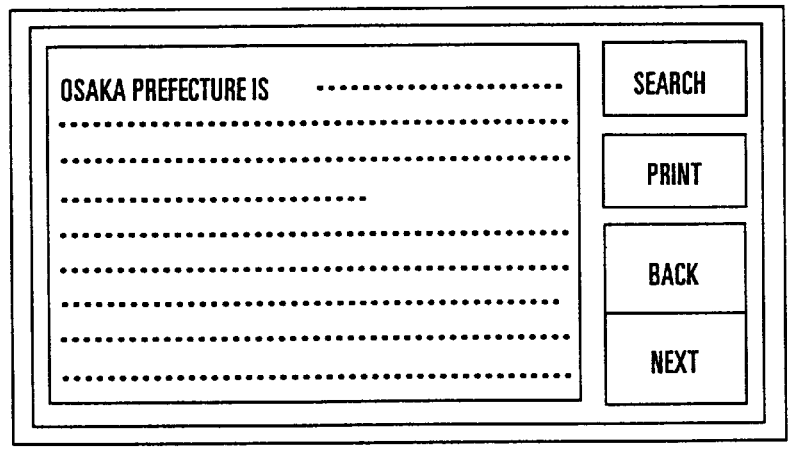
FIGS. 27A to 27C are views showing converted pictures of the AP 102 to be presented to visually handicapped users in the embodiment.
Figure 27B:
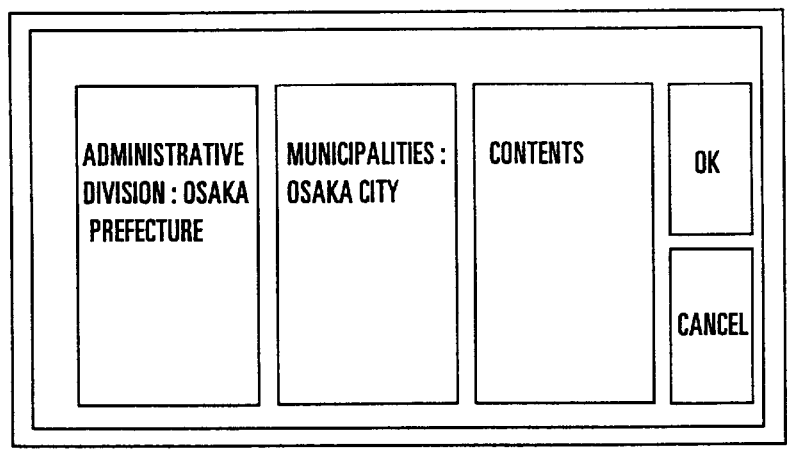
Figure 27C:
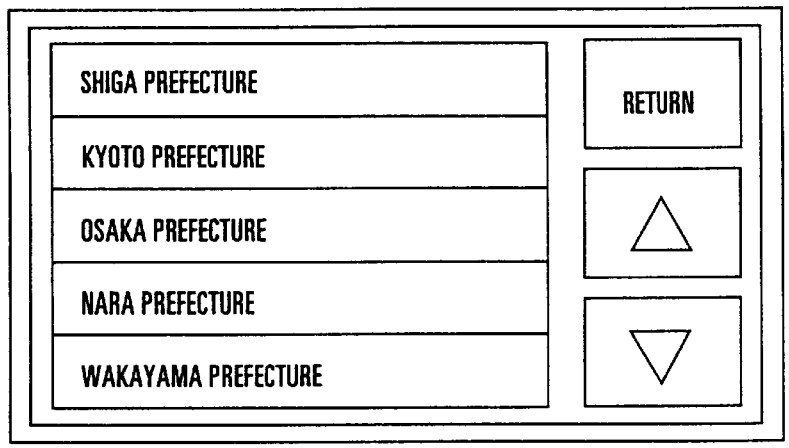

Referring to FIGS. 27A to 27C, assuming the use of the program by a visually handicapped user with a touch panel, the scroll bar is converted into voice components in units of lines by "specific replacement component" to allow the user to operate the program by using the target point change function, "attribute conversion-component enlargement", and the "return button" as a virtual component.

Figure 28:
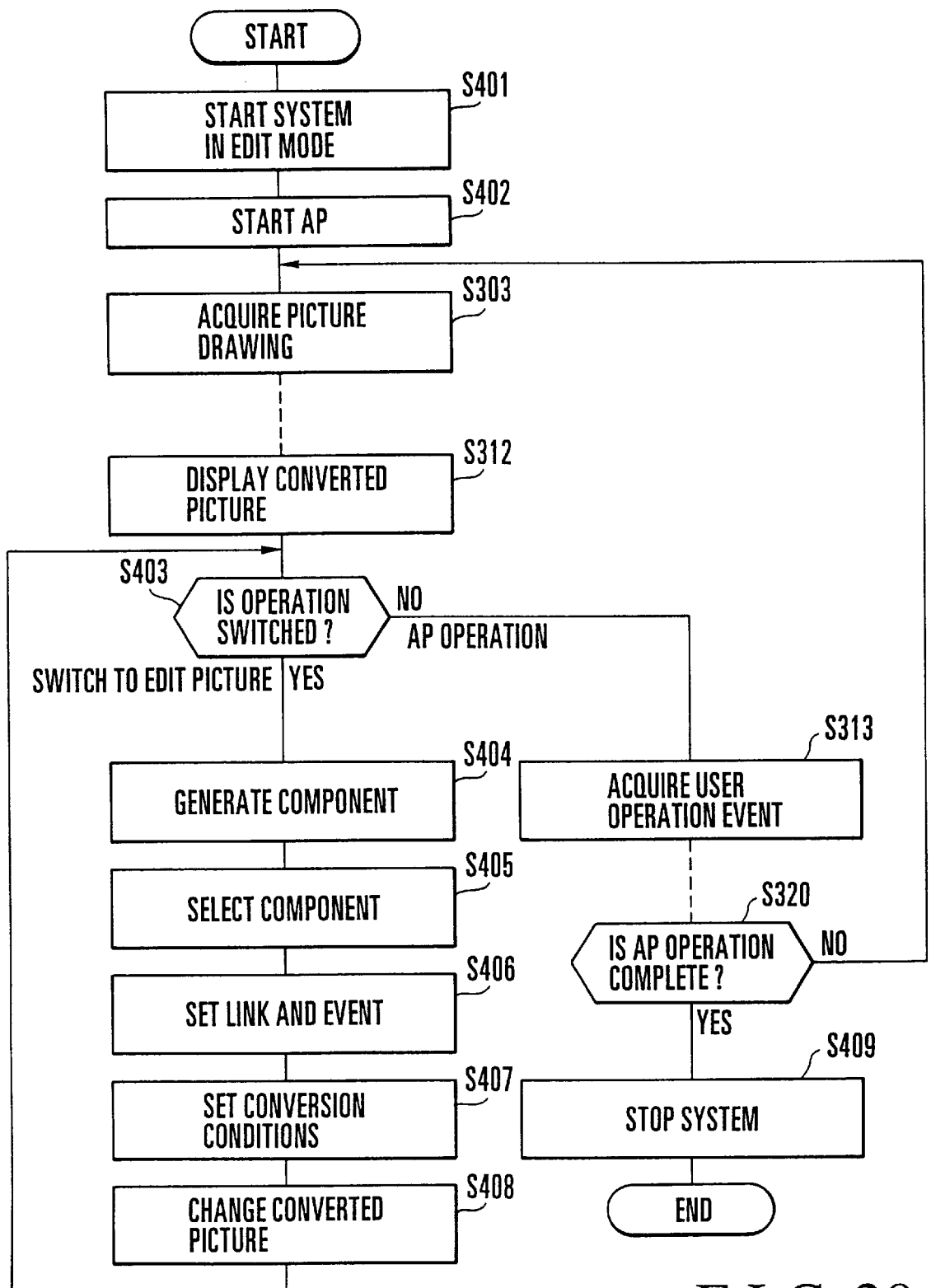
FIG. 28 is a flow chart for explaining the operation of the user interface conversion apparatus in FIG. 1 in the change mode.

The procedure for a changing operation will be described next with reference to the flow chart of FIG. 28.

After the apparatus is started on the OS 101 in the edit mode (step S401), the AP 102 is started (step S402). When the AP 102 is started, the window of the AP 102 opens, and a picture drawing event occurs. The processing of acquiring this picture drawing event and displaying the converted picture is the same as in steps S303 to S312 in FIG. 6.

A normal AP operation is performed until the picture to be converted is displayed. This operation is the same as in steps S313 to S320 in FIG. 6. In step S312, the converted picture is displayed again.

When the picture is switched to the edit picture (step S403), the converted picture editing section 211 and the generated component linking section 212 are started to allow the producer of pictures to edit the components on the picture in this state. That is, the producer generates components by a dedicated editor (step S404), selects a component to be set (step S405), and sets a link and an event with respect to this component (step S406). In setting this link, a list of display components on the original picture is displayed on the basis of the picture information in the current AP operation, and a component corresponding to the component to be set is selected from this list. Conversion conditions are then set. In this case, a list of information conversion and specific information conversion methods for the component is presented, the producer selects conditions from this list and inputs necessary parameters. Upon completion of the setting operation, the converted picture display is changed of the picture display with the new settings.

As has been described above, in the user interface conversion apparatus having the above arrangement, picture information is extracted from an existing application, and conversion is performed for the information at a designated target point. With this operation, the apparatus extracts only necessary information from the original picture information and automatically generates a converted picture without changing the existing application program or requiring the producer of pictures to re-generate all picture data.

In addition, since picture conversion elements include the function of changing the attribute information of picture information, the function of changing components on a picture, and the function of adding new function components which do not exit on the original picture, flexible picture conversion can be performed. Therefore, there is provided a function of allowing the producer of pictures to modify a specific picture or some components so as to partially perform specific conversion, or to perform picture conversion interactively while referring to the original application picture.

Furthermore, a converted picture interface can be presented to visually handicapped users and users of advanced age with media other than visual media.

What is claimed is:

1. A user interface conversion method of converting a picture interface provided by an application program running on an operating system having a graphical user interface to generate and provide a new picture interface, comprising the steps of:

acquiring picture information of the application program in response to, as a trigger, a change in the picture provided by the application program;

determining a target point in the acquired picture information;

generating converted picture information from the determined target point by referring to conversion template information stored in a conversion template storage section;

generating specific converted picture information by referring to specific conversion information stored in a specific conversion information storage section;

displaying a converted picture in accordance with the generated converted picture information and the generated specific converted picture information.

2. A user interface conversion apparatus including input means, output means, an operating system having a graphical user interface, and an application program which runs on the operating system, and adapted to convert a picture interface provided by the application program so as to generate and provide a new picture interface, comprising:

event acquiring means for detecting an input event from said input means and an event of a picture change in a window, a menu, and a button on the picture interface;

picture information acquiring means for extracting picture information including at least logic structure information, layout information, and attribute information of interactive components including a window, a menu, and a button displayed on a picture, as elements, in response to a picture change event detected by said event acquiring means;

target point extracting means for setting a target point on one of a display window of the application program and currently focused interactive components by using target point information preset in the picture information extracted by said picture information acquiring means, and extracting target point picture information as picture information at the set target point;

converted interface generating means for generating a converted picture from the target point picture information extracted by said target point extracting means, and generating converted picture information including at least logic structure information, layout information, and attribute information of interactive components on the generated converted picture, link information with respect to interactive components on the picture interface provided by the original application program, and information of a corresponding event, as elements;

converted interface control means for presenting a converted picture to an output unit in accordance with the converted picture information generated by said converted interface generating means, and generating an event for driving the application program by referring to pre-stored converted picture information upon reception of an operation event for the converted picture from said event acquiring means; and wherein said converted interface generating means comprises information converting means for performing picture conversion in accordance with the picture information extracted by said target point extracting means so as to allow various types of picture conversion, and wherein said information converting means is constituted by at least one of pairs including a first pair of attribute conversion information storage means for storing attribute conversion information for converting attribute information including a size and position of an interactive component and a caption (item name) and attribute conversion executing means for executing attribute conversion on the basis of the attribute conversion information stored in said attribute conversion information storage means, a second pair of component replacement information storage means for storing component replacement information for replacing an interactive component including replacement of a given button with another button, and component replacing means for executing component replacement on the basis of the component conversion information stored in said component replacement information storage means, and a third pair of virtual component addition information storage means for storing virtual component addition information for adding a new interactive component which does not exist on extracted picture information and virtual component addition executing means for adding a virtual component on the basis of the virtual component addition information stored in said virtual component addition information storage means.

3. An apparatus according to claim 2, further comprising:

picture information storage means for storing picture information acquired by said picture information acquiring means and outputting the information to said target point extracting means;

converted picture information storage means for storing converted picture information generated by said converted interface generating means, and outputting the information to said converted interface control means; and target point information storage means for storing target point information to be used by said target point extracting means.

4. An apparatus according to claim 2, wherein said converted interface generating means further comprises converted interface generation control means for controlling a picture converting operation of said information converting means.

5. An apparatus according to claim 2, wherein said converted interface generating means further comprises:
   conversion template storage means for storing template information for information conversion; and
   specific information conversion means for converting specific information constituted by at least one of a specific picture and an interactive component by referring to the template information stored in said conversion template storage means so as to allow picture conversion in detail.

6. An apparatus according to claim 5, wherein said converted interface generating means further comprises:
   converted picture editing means for allowing a picture producer to generate and edit a converted picture and a converted component by referring to a picture interface provided by an original application program;
   generated component linking means for generating a link between the converted component generated by said converted picture editing means and an interactive component on the original application program; and
   conversion template generating means for generating template information stored in said conversion template storage means from converted picture information of the converted picture edited by said converted picture editing means.

7. An apparatus according to claim 3, wherein said converted interface control means comprises:
   converted interface control executing means for presenting the picture generated by said converted interface generating means to said output means, and generating an event for starting the application program by referring to the converted picture information stored in said converted picture information storage means upon reception of an operation event for a converted picture from said event acquiring means;
   media addition information storage means for storing media addition information used for a visually handicapped user and a user of advanced age;
   media addition means for performing information conversion for synthetic voice, braille, and tactile pin display by referring to the media addition information stored in said media addition information storage means upon occurrence of an event such as movement of a mouse pointer or a touch operation;
   target point change information storage means for storing target point change information for changing a target point with respect to an interactive component regarded as a target component by a user; and
   target point change control means for performing target point control in accordance with an operation performed by the user by referring to the target point change information stored in said target point change information storage means.

8. A user interface conversion method of converting a picture interface provided by an application program running on an operating system having a graphical user interface to generate and provide a new picture interface, comprising the steps of:
   acquiring picture information of the application program in response to, as a trigger, a change in the picture provided by the application program;
   determining a target point in the acquired picture information;
   generating converted picture information from the determined target point by referring to conversion template information;
   displaying a converted picture in accordance with the generated picture information;
   acquiring an operation event from an input unit;
   executing a media addition in accordance with the operation event and interactive component information corresponding to the operation event and stored in an interactive component information storage section.

9. A user interface conversion apparatus including input means, output means, an operating system having a graphical user interface, and an application program which runs on the operating system, and adapted to convert a picture interface provided by the application program so as to generate and provide a new picture interface, comprising:
   event acquiring means for detecting an input event from said input means and an event of a picture change in a window, a menu, and a button on the picture interface;
   picture information acquiring means for extracting picture information including at least logic structure information, layout information, and attribute information of interactive components including a window, a menu, and a button displayed on a picture, as elements, in response to a picture change event detected by said event acquiring means;
   target point extracting means for setting a target point on one of a display window of the application program and currently focused interactive components by using target point information preset in the picture information extracted by said picture information acquiring means, and extracting target point picture information as picture information at the set target point;
   converted interface generating means for generating a converted picture from the target point picture information extracted by said target point extracting means, and generating converted picture information including at least logic structure information, layout information, and attribute information of interactive components on the generated converted picture, link information with respect to interactive components on the picture interface provided by the original application program, and information of a corresponding event, as elements; and
   converted interface control means for presenting a converted picture to an output unit in accordance with the converted picture information generated by said converted interface generating means, and generating an event for driving the application program by referring to pre-stored converted picture information upon reception of an operation event for the converted picture from said event acquiring means, and wherein said converted interface control means comprises media addition information storage means for storing media addition information used for a visually handicapped user and a user of advanced age, and media addition means for performing information conversion for synthetic voice, braille, and tactile pin display by referring to the media addition information stored in said media addition information storage means upon occurrence of an event such as movement of a mouse pointer or a touch operation.

10. A user interface conversion apparatus including input means, output means, an operating system having a graphical user interface, and an application program which runs on the operating system, and adapted to convert a picture interface provided by the application program so as to generate and provide a new picture interface, comprising:

event acquiring means for detecting an input event from said input means and an event of a picture change in a window, a menu, and a button on the picture interface;

picture information acquiring means for extracting picture information including at least logic structure information, layout information, and attribute information of interactive components including a window, a menu, and a button displayed on a picture, as elements, in response to a picture change event detected by said event acquiring means;

target point extracting means for setting a target point on one of a display window of the application program and currently focused interactive components by using target point information preset in the picture information extracted by said picture information acquiring means, and extracting target point picture information as picture information at the set target point;

converted interface generating means for generating a converted picture from the target point picture information extracted by said target point extracting means, and generating converted picture information including at least logic structure information, layout information, and attribute information of interactive components on the generated converted picture, link information with respect to interactive components on the picture interface provided by the original application program, and information of a corresponding event, as elements;

converted interface control means for presenting a converted picture to an output unit in accordance with the converted picture information generated by said converted interface generating means, and generating an event for driving the application program by referring to pre-stored converted picture information upon reception of an operation event for the converted picture from said event acquiring means; and wherein said converted interface generating means comprises conversion template storage means for storing template information for information conversion, and specific information conversion means for converting specific information constituted by at least one of a specific picture and an interactive component by referring to the template information stored in said conversion template storage means so as to allow picture conversion in detail; and wherein said specific information converting means is constituted by at least one of pairs including a first pair of specific attribute conversion information storage means for storing specific attribute conversion information for converting specific attribute information including a size and position of a specific interactive component and a caption (item name) and specific attribute conversion executing means for executing specific attribute conversion on the basis of the specific attribute conversion information stored in said specific attribute conversion information storage means, a second pair of specific component replacement information storage means for storing specific component replacement information for replacing a specific interactive component including replacement of a specific given button with another button, and specific component replacing means for executing specific component replacement on the basis of the specific component conversion information stored in said specific component replacement information storage means, and a third pair of specific virtual component addition information storage means for storing specific virtual component addition information for adding a new specific interactive component which does not exist on extracted picture information and specific virtual component addition executing means for adding a specific virtual component on the basis of the specific virtual component addition information stored in said specific virtual component addition information storage means.

* * * * *